United States Patent
Bosisio et al.

(10) Patent No.: US 9,387,418 B2
(45) Date of Patent: *Jul. 12, 2016

(54) MEDIA BED FILTERS FOR FILTERING FINE PARTICLES FROM A RAW LIQUID FLOW AND METHOD OF USING THE SAME

(71) Applicant: SONITEC-VORTISAND TECHNOLOGIES INC., St-Laurent (CA)

(72) Inventors: Marco Bosisio, Pierrefonds (CA); Alain Silverwood, St-Eustache (CA)

(73) Assignee: Neptune-Benson, LLC, Coventry, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/413,326

(22) PCT Filed: Jul. 16, 2013

(86) PCT No.: PCT/CA2013/000648
§ 371 (c)(1),
(2) Date: Jan. 7, 2015

(87) PCT Pub. No.: WO2014/012167
PCT Pub. Date: Jan. 23, 2014

(65) Prior Publication Data
US 2015/0190738 A1    Jul. 9, 2015

Related U.S. Application Data

(60) Provisional application No. 61/672,098, filed on Jul. 16, 2012.

(51) Int. Cl.
*B01D 24/10* (2006.01)
*B01D 24/14* (2006.01)
(Continued)

(52) U.S. Cl.
CPC .............. *B01D 24/105* (2013.01); *B01D 24/14* (2013.01); *B01D 24/40* (2013.01); *B01D 24/4678* (2013.01); *C02F 1/001* (2013.01); *B01D 2024/145* (2013.01); *C02F 2103/02* (2013.01)

(58) Field of Classification Search
CPC ........ B01D 23/10; B01D 23/20; B01D 23/24; B01D 24/10; B01D 24/14; B01D 24/40; B01D 24/46; B01D 24/105; B01D 24/407; B01D 24/4621; B01D 24/4631
See application file for complete search history.

(56) References Cited

U.S. PATENT DOCUMENTS 2,445,287 A    7/1948    Woods
3,493,116 A *  2/1970    Edmiston ............... B01D 23/10
                                                       210/266

(Continued)

FOREIGN PATENT DOCUMENTS

EP    1329251 A1    7/2003
FR    2099811       3/1972

(Continued)

OTHER PUBLICATIONS

Jackson, A. https://geographyas.info/rivers/river-processes/. Accessed Sep. 3, 2015.*

(Continued)

*Primary Examiner* — Katherine Zalasky
*Assistant Examiner* — Benjamin Lebron
(74) *Attorney, Agent, or Firm* — Salter & Michaelson

(57) ABSTRACT

The present document describes a media bed filter for filtering fine particles from a raw liquid flow, the media bed filter comprising: a tank having: a top portion; a bottom portion defining a bottom surface for receiving a media bed, the media bed having a supporting media to be disposed on the bottom surface and a filtering media for covering the supporting media, the top portion of the tank being above the filtering media of the media bed; a raw liquid inlet in fluid communication with a nozzle configuration located in the top portion of the tank for providing the raw liquid flow in the tank in the form of a plurality of jets at a directional velocity substantially equal or greater to a disengagement velocity of the filtering media.

6 Claims, 26 Drawing Sheets

(51) Int. Cl.
  *B01D 24/40* (2006.01)
  *C02F 1/00* (2006.01)
  *B01D 24/46* (2006.01)
  *C02F 103/02* (2006.01)

(56) References Cited

U.S. PATENT DOCUMENTS

| | | | |
|---|---|---|---|
| 7,097,766 | B2 | 8/2006 | Moya |
| 2003/0080039 | A1 | 5/2003 | Cocoli |
| 2003/0183570 | A1 | 10/2003 | Takarabe |
| 2004/0040904 | A1 | 3/2004 | Nagaoka |
| 2005/0035071 | A1* | 2/2005 | Tolley .................. B01D 24/14 210/793 |
| 2010/0176071 | A1 | 7/2010 | Mimura et al. |
| 2010/0320159 | A1 | 12/2010 | Lee et al. |
| 2014/0014598 | A1 | 1/2014 | Bosisio et al. |

FOREIGN PATENT DOCUMENTS

| | | |
|---|---|---|
| GB | 268576 | 4/1927 |
| GB | 1342082 | 12/1973 |
| GB | 2461119 B | 11/2011 |
| NL | 7809262 | 3/1980 |
| WO | WO 02/34677 A3 | 5/2002 |
| WO | WO 03/105987 A1 | 12/2003 |
| WO | WO 2013/045868 A1 | 4/2013 |

OTHER PUBLICATIONS

David Ward et al., Suppression of 'Filter Cake' Within a Media Pressure Filter by Vortex Surface Scouring, Filtration—Coalville-; 8, 2; 114-118, 2008.

PCT/CA2013/000648 International preliminary report with related claims 1-25.

PCT/CA2013/000648 International search report with related claims 1-20.

PCT/CA2013/000648 search strategy.

PCT/CA2013/000648 Written opinion.

EP application 13820254 search report and opinion dated Mar. 1, 2016 with claims.

U.S. Appl. No. 13/943,323 rejection with related claims.

* cited by examiner

MEDIA BED FILTERS FOR FILTERING FINE PARTICLES FROM A RAW LIQUID FLOW AND METHOD OF USING THE SAME

CROSS-REFERENCE TO RELATED APPLICATIONS

This application claims priority of U.S. provisional patent application 61/672,098 filed on Jul. 16, 2012.

BACKGROUND (a) Field

The subject matter disclosed generally relates to filtering apparatus and methods of using the same. More particularly, the subject matter relates to media bed filters for filtering fine particles from a raw liquid flow.

(b) Related Prior Art

Media bed filters work by providing the solid particles with many opportunities to be captured on the surface and within a filtering media bed. As fluid is evenly distributed at the top of the filter, it gently flows through the porous sand (i.e., filtering media) along a tortuous route, the particles come close and in contact with the media bed. They can be captured by one of several mechanisms such as, direct collision, Van der Waals or London force attraction, surface charge attraction, diffusion, and the like.

In addition, solid particles can be prevented from being captured by surface charge repulsion if the surface charge of the filtering media is of the same sign (i.e., positive or negative) as that of the particulate solid. Furthermore, it is possible to dislodge captured solid particles although they may be re-captured at a greater depth within the media bed.

Filtering media beds can be operated either with upward flowing fluids or downward flowing fluids the latter being much more usual. For downward flowing filtering media beds, the fluid can flow under pressure or by gravity alone. Pressure media bed filters tend to be used in industrial applications. Gravity fed units are used in water purification especially in large application such as drinking water.

Overall, there are several categories of filtering media beds such as, without limitation, gravity media bed filters, pressure media bed filters, upflow media bed filters, slow media bed filters, multimedia bed filters and the like.

All of these apparatus and methods are used extensively in the water industry throughout the world.

For example, water from cooling tower attracts and absorbs most dirt and airborne on a continuous basis. The majority of suspended solids in circulating cooling water loops are from about 0-5 micron in size, mainly because of chemical dispersing agents that are designed to limit circulating (i.e., dust and minerals kept in suspension by dispersing chemical agents) dirt from agglomerating on heat exchange surfaces. Dirt does negatively affect heat exchange surfaces and cooling tower fill efficiency. Traditional filters, strainers and separators will not remove significantly these very fine contaminants before they settle out in low flow areas, clog strainers, nozzles, and bio-fouled heat exchangers. Usually, most media bed filters of this kind are not able to significantly retain suspended solid of less than 5 microns in size. There is therefore a need to provide a media bed filter designed to provide an improved filtration for fine particles down to 0.5 microns. For example, a traditional multi-layers media bed filter having 3 layers including garnet is able to filter particles only down to 10 or 20 microns.

For example and referring now to Prior Art FIGS. 1A, 1B, 1C, 1D and 1E, there are shown traditional sand filters. These traditional sand filters offer a plurality of disadvantages. One of them is that, a slope is created by the raw liquid fluid entering the tank. The prior art configuration will allow the raw liquid flow to dig at one place only on the media bed. Thus, according to the traditional media bed filter, only a portion of the media bed is utilized as the filtering surface. One of the other disadvantages is that traditional sand filters cannot be used at greater flow rates. When using traditional sand filters, water needs to enter the tank at a substantially small velocity and cannot include many flow rate variations. Additionally, such configurations proposed by traditional media bed filters may lead the particles to form a cake layer on the top portion of the media bed and may also block the media bed filter. Thus, the maintenance of such media bed filters needs to be made on a regular basis for reducing formation of cakes with the media bed. For example, is FIG. 1A, the raw liquid flow which enters the tank follows a laminar flow (i.e., without or with reduced turbulence areas).

Many filters are already known in many applications, such as, without limitation, chilled and hot water loops, condensate return, cooling tower make up, iron removal, ion exchange resin pre-filtration, membrane pre-filtration, potable water and beverage filtration, process rinse water, process water intake, water reuse, welder water loops and the like.

Moreover, traditional filters will require coagulants or polymers to improve their efficiency towards smaller particles. Existing vortex filters have the disadvantage of having poor backwash efficiency, resulting in higher water consumption, wastewater and important energy costs.

Traditional vortex filters do not allow good backwash efficiency and are prompt to short-circuiting even when clean. In fact, the single injector located at a significant distance from the apex of the tank creates a significant distortion of the fine sand surface (FIG. 1B) (i.e., also called microsand or ultrafine sand) with one side of the media bed being significantly deeper than its opposite side creating a significant slope in the filtering media of about 30 to about 40°. This slope creates a distortion in the hydraulic distribution of the fluid at the surface and in the depth of the media bed. This phenomenon does not allow the known vortex filter to use efficiently the filtration surface area. This is especially true for filters of larger surface such as 30 inches of diameter and above. As for the backwash process, the typical single injector, located at a significant distance from the apex of the tank, does not allow for a good capture of the particles (or fine particles) to be removed as this design does not allow for a plug flow removal process. It is to be noted that the configuration as shown in FIG. 1B would not result in a good hydraulic flow. The media bed, and more particularly the filtering media is significantly deformed by the water flow which enters the tank at a significant distance from the apex of the tank.

Furthermore, open-tank media bed filters include a raw liquid flow inlet which is configured so to lead the water gently above the filtering media so that the particles flow gently within the filtering media, and the filtering media surface is not in motion nor disturbed.

There is therefore a need for improved media bed filters for filtering and backwashing fine particles from a raw liquid flow and for methods of using the same.

SUMMARY

According to an embodiment, there is provided a media bed filter for filtering fine particles from a raw liquid flow, the media bed filter comprising: a tank having: a top portion; a bottom portion defining a bottom surface for receiving a media bed, the media bed having a supporting media to be disposed on the bottom surface and a filtering media for covering the supporting media, the top portion of the tank being above the filtering media of the media bed; a raw liquid inlet in fluid communication with a nozzle configuration located in the top portion of the tank for providing the raw liquid flow in the tank in the form of a plurality of jets at a directional velocity substantially equal or greater to a disengagement velocity of the filtering media.

According to another embodiment, the nozzle configuration comprises a plurality of nozzles, each one of the plurality of nozzles for providing the raw liquid flow in the tank in the form of a respective one of the plurality of jets at the directional velocity towards the filtering media.

According to a further embodiment, the plurality of nozzles is oriented in opposite directions.

According to yet another embodiment, the top portion of the tank defines a top portion surface and further wherein the nozzle configuration is oriented for providing the plurality of jets towards the top portion surface of the tank, thereby providing the raw liquid flow in the tank at a parallel velocity substantially equal or greater to the disengagement velocity of the filtering media.

According to another embodiment, the nozzle configuration is one of: located above the raw liquid inlet within the top portion of the tank and located below the raw liquid inlet within the top portion of the tank.

According to a further embodiment, the nozzle configuration is oriented for providing the plurality of jets perpendicularly towards the filtering media of the media bed.

According to yet another embodiment, the media bed filter further comprises a baffle located in the top portion of the tank and between the nozzle configuration and the filtering media.

According to another embodiment, the baffle is located substantially above the filtering media, thereby providing the raw liquid flow in the tank at a parallel velocity substantially equal or greater to the disengagement velocity of the filtering media.

According to a further embodiment, the raw liquid inlet comprises a plurality of raw liquid inlets, each one of the plurality of raw liquid inlets being in fluid communication with a respective nozzle configuration.

According to yet another embodiment, the nozzle configuration is one of: oriented in an upward direction for providing the plurality of jets to enter the tank in an upwardly direction and oriented in a downwardly direction for providing the plurality of jets to enter the tank in a downwardly direction.

According to another embodiment, the nozzle configuration is oriented for providing the plurality of jets horizontally towards the filtering media of the media bed, the nozzle configuration being located in the top portion of the tank at substantially the same level of the filtering media.

According to a further embodiment, each one of the plurality of nozzles defines a shape comprising at least one of: an elbow-like shape, a straight-like shape, a curved-like shape, a regular polygonal-like shape, a segmented-like shape, an irregular polygonal-like shape, a circular-like shape, an angular-like shape and any combination thereof.

According to yet another embodiment, the media bed filter of claim 1, further comprising a baffle within the top portion of the tank for receiving the plurality of jets, thereby providing the raw liquid flow in the tank at a parallel velocity substantially equal or greater to the disengagement velocity of the filtering media.

According to another embodiment, the baffle comprises a plurality of baffles, each one of the plurality of baffles being located substantially above the filtering media, parallel and laterally distant from another one of the plurality of baffles.

According to a further embodiment, the plurality of baffles comprises displaceable baffles.

According to another embodiment, there is provided a method for filtering fine particles from a raw liquid flow in a tank supporting a filtering media, the tank having a top portion, the method comprising the steps of: receiving the raw liquid flow with fine particles; and providing the raw liquid flow in the top portion of the tank in the form of a plurality of jets at a directional velocity substantially equal or greater to a disengagement velocity of the filtering media.

According to a further embodiment, the providing the raw liquid flow in the top portion of the tank in the form of a plurality of jets comprises providing the raw liquid flow in the top portion of the tank in the form of a plurality of jets oriented in opposite directions, thereby providing the raw liquid flow in the tank at a parallel velocity substantially equal or greater to the disengagement velocity of the filtering media.

According to yet another embodiment, the providing the raw liquid flow in the top portion of the tank in the form of a plurality of jets comprises providing the raw liquid flow in the top portion of the tank in the form of a plurality of jets towards a top portion surface of the tank, thereby providing the raw liquid flow in the tank at a parallel velocity substantially equal or greater to the disengagement velocity of the filtering media.

According to another embodiment, the providing the raw liquid flow in the top portion of the tank in the form of a plurality of jets comprises providing the plurality of jets perpendicularly towards the filtering media of the media bed.

According to a further embodiment, the providing the raw liquid flow in the top portion of the tank in the form of a plurality of jets comprises providing the raw liquid flow in the top portion of the tank in the form of a plurality of jets at substantially the same level of the filtering media, thereby providing the raw liquid flow in the tank at a parallel velocity substantially equal or greater to the disengagement velocity of the filtering media.

The following terms are defined below.

The term "top portion of the tank" is intended to mean the portion defined by the tank which is above the filtering media of the media bed.

The term "bottom portion of the tank" is intended to mean the portion defined by the tank from the bottom surface of the tank to the filtering media of the media bed.

The term "filtering media" is intended to mean the fine granular filtering media covering the supporting media and/or in movement inside the tank and above the media bed.

The term "fine particle" is intended to mean the particles in the raw liquid flow to be filtered by the media bed filter.

The term "media bed" is intended to mean a bed which includes the filtering media of the media bed filter which covers the supporting media and the supporting media.

The term "supporting media" is intended to mean a portion of the supporting media bed which supports the filtering media of the media bed filter or which is covered by the filtering media of the media bed. The supporting media may be a rigid bottom compact media, such as a metallic supporting bed with openings or the supporting media may include a plurality of layers of granular materials including, without limitations rock, sand, river sand and/or rocks, and the like. The "supporting media" may also include a false floor to be installed above the bottom surface of the tank.

The term "nozzle configuration" is intended to mean an end portion of the raw liquid inlet which is located in the top portion the tank and which forms a plurality of jets to enter the tank. The nozzle configuration may include a plurality of nozzles. The nozzle configuration may allow the plurality of jets to circulate towards a top portion surface of the tank, towards the filtering media of the media bed and/or towards a baffle which is located in the tank (or the like).

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1A:
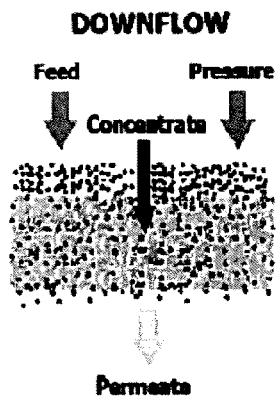
FIG. 1A illustrates the media bed of a sand filter in accordance with the prior art.
Figure 1B:
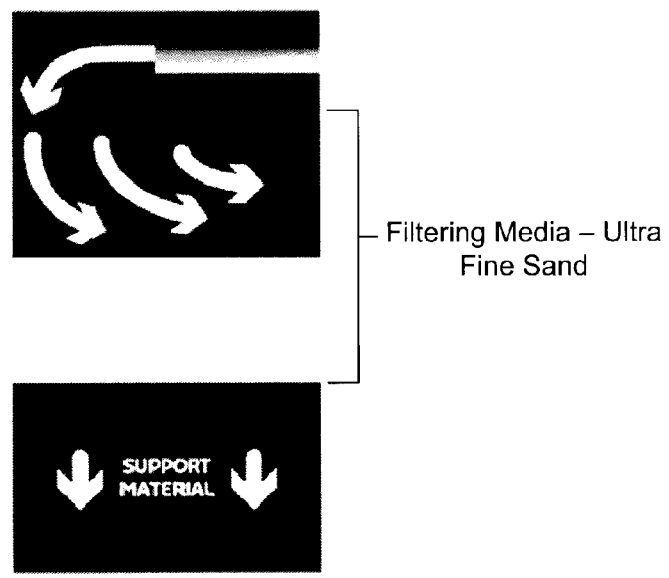
FIG. 1B illustrates the media bed of a sand filter in accordance with the prior art.
Figure 1C:
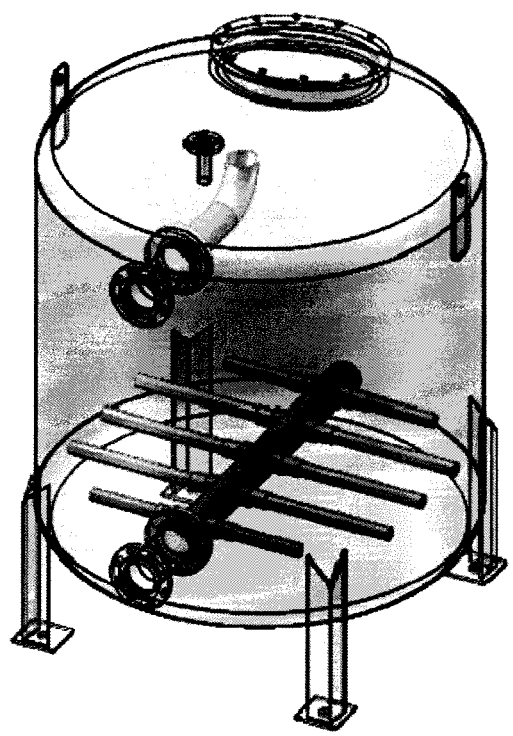
FIG. 1C illustrates a sand filter in accordance with the prior art which includes one and only one raw liquid inlet located in the top portion of the tank.
Figure 1D:
FIG. 1D illustrates a sand filter in accordance with the prior art which includes one and only one raw liquid inlet located in the top portion of the tank.
Figure 1E:
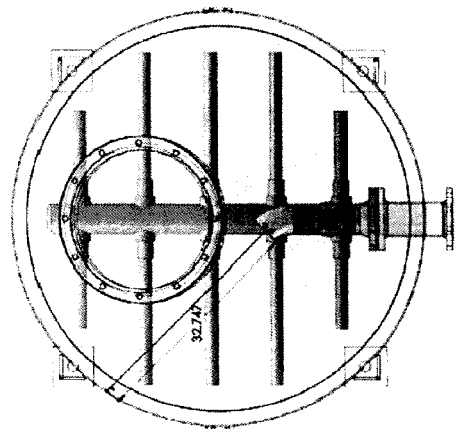
FIG. 1E illustrates a top view of the sand filter of FIG. 1C.
Figure 2A:
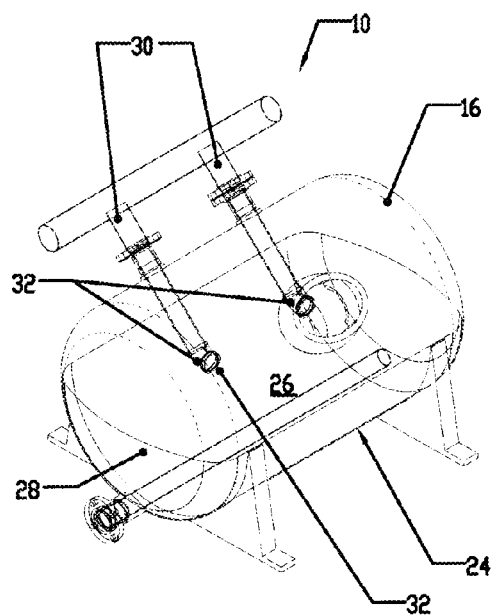
FIG. 2A is a schematic perspective view of a media bed filter for filtering fine particles from a raw liquid flow in accordance with an embodiment.
Figure 2B:
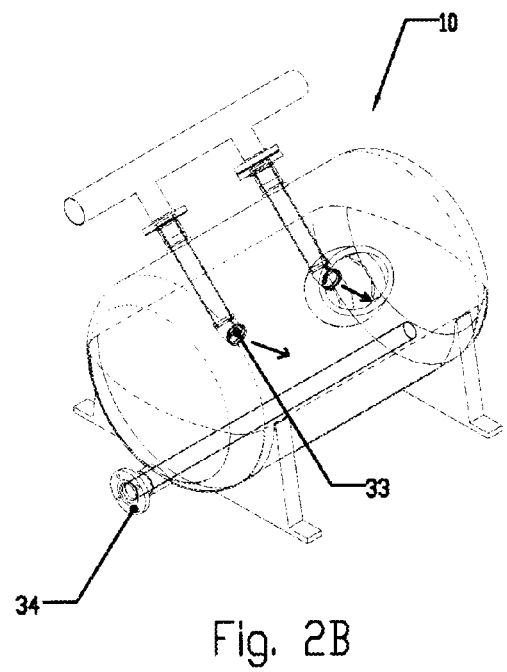
FIG. 2B is another perspective view of the media bed filter of FIG. 2A.
Figure 2C:
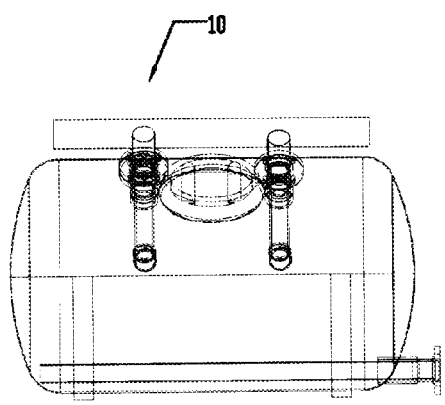
FIG. 2C is a top plan view of the media bed filter of FIG. 2A.
Figure 2D:
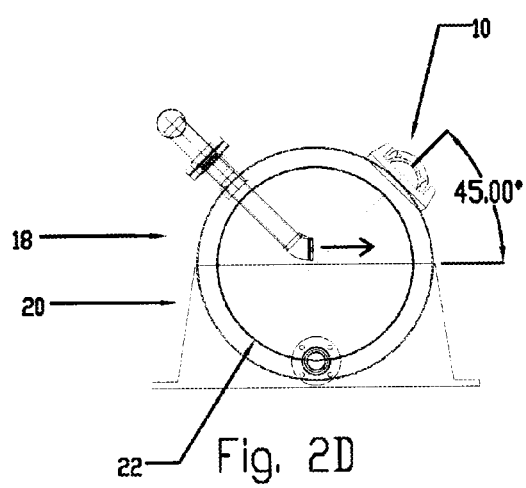
FIG. 2D is a side elevation view of the media bed filter of FIG. 2A.
Figure 3A:
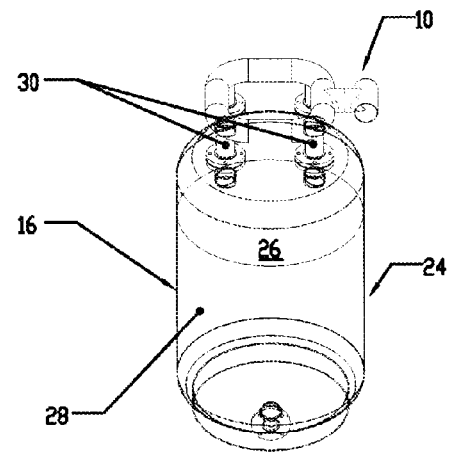
FIG. 3A is a schematic perspective view of a media bed filter for filtering fine particles from a raw liquid flow in accordance with another embodiment.
Figure 3C:
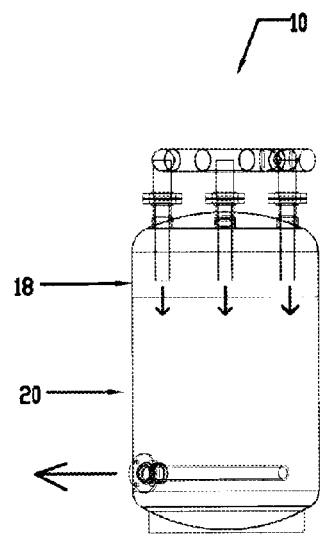
FIG. 3C is an elevation view of the media bed filter of FIG. 3A.
Figure 3B:
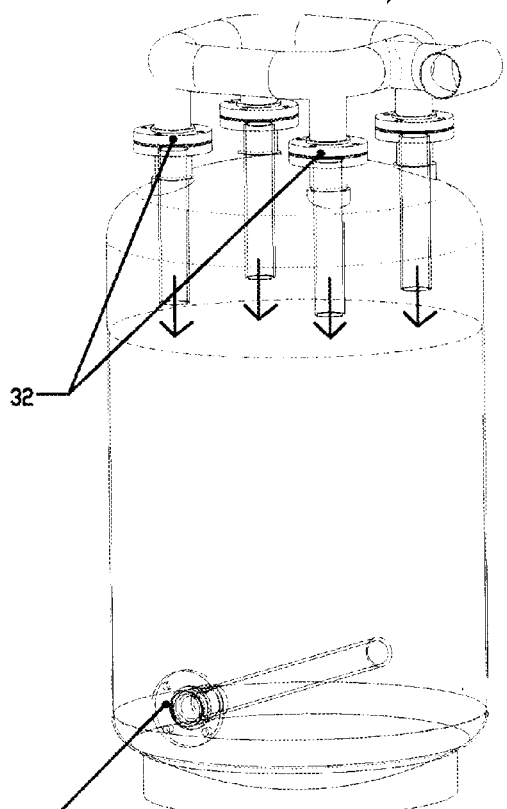
FIG. 3B is another perspective view of the media bed filter of FIG. 3A.
Figure 3D:
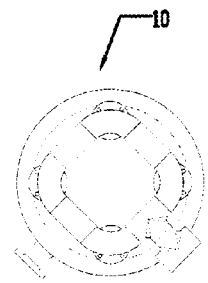
FIG. 3D is a top plan view of the media bed filter of FIG. 3A.
Figure 4A:
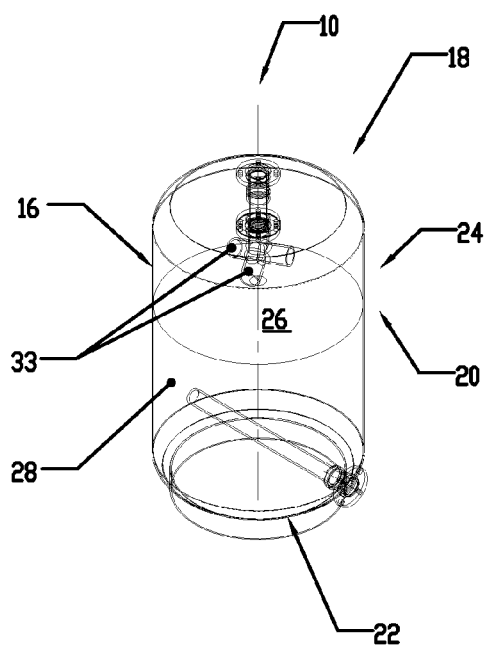
FIG. 4A is a schematic perspective view of a media bed filter for filtering fine particles from a raw liquid flow in accordance with another embodiment.
Figure 4B:
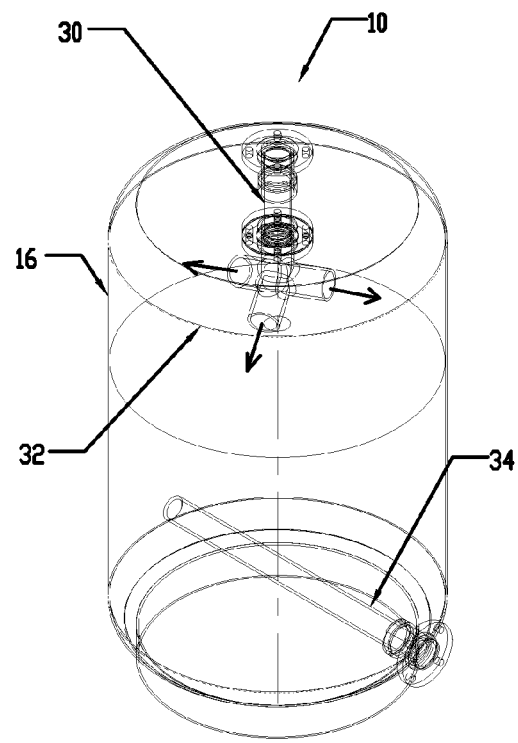
FIG. 4B is another perspective view of the media bed filter of FIG. 4A.
Figure 4C:
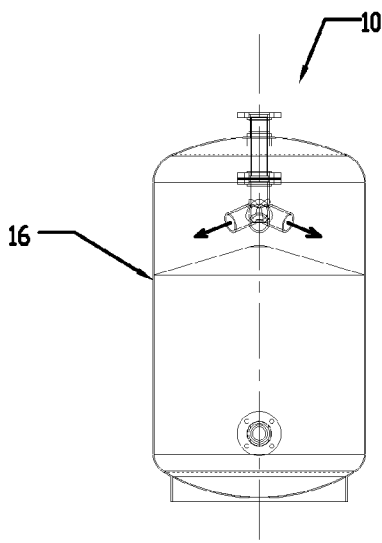
FIG. 4C is an elevation view of the media bed filter of FIG. 4A.
Figure 4D:
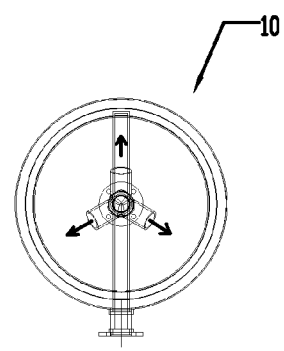
FIG. 4D is a top plan view of the media bed filter of FIG. 4A.
Figures 5A, 5B, 5C, 5D:
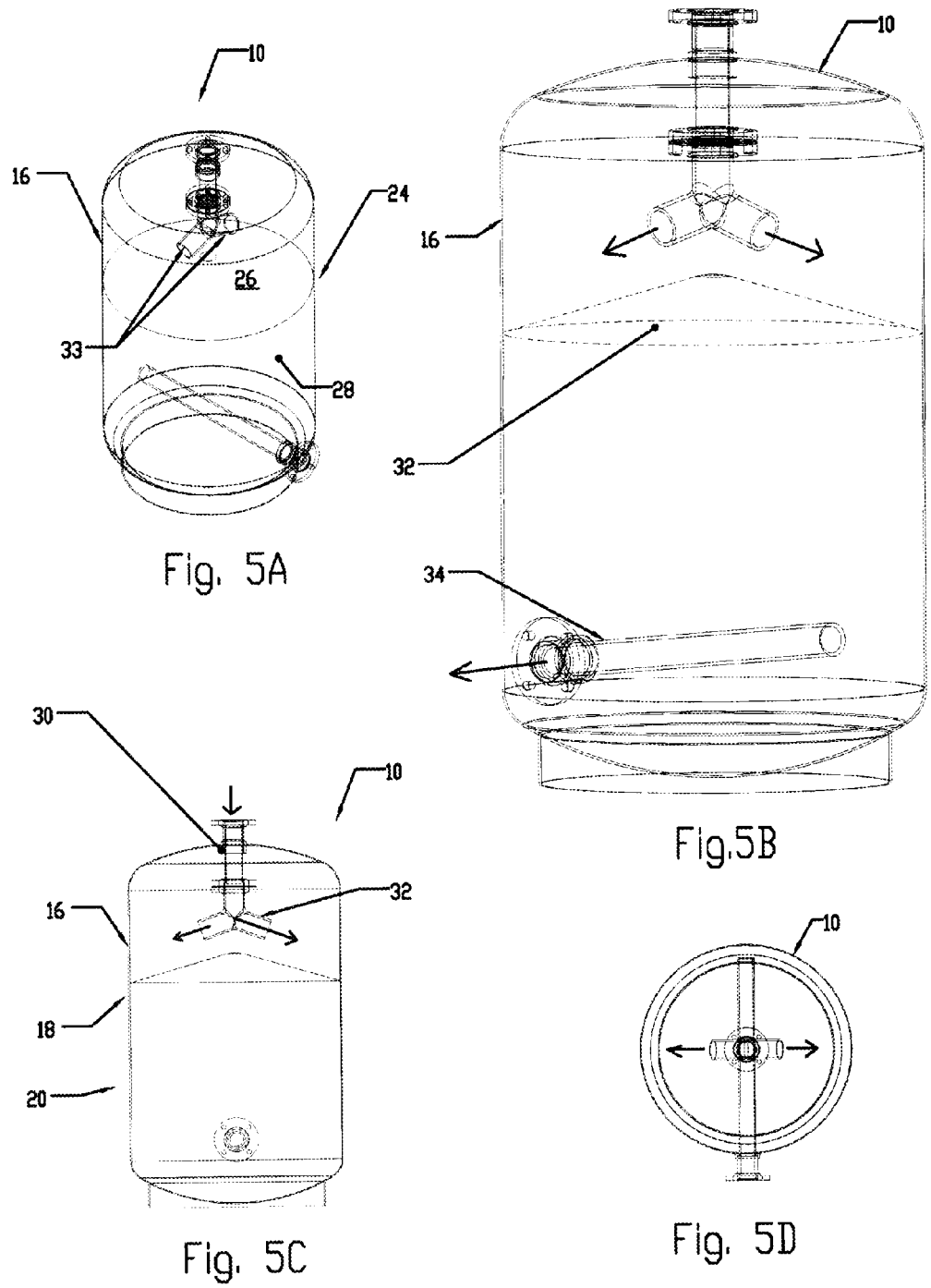
FIG. 5A is a schematic perspective view of a media bed filter for filtering fine particles from a raw liquid flow in accordance with another embodiment.
FIG. 5B is another perspective view of the media bed filter of FIG. 5A.
FIG. 5C is an elevation view of the media bed filter of FIG. 5A.
FIG. 5D is a top plan view of the media bed filter of FIG. 5A.
Figure 6A:
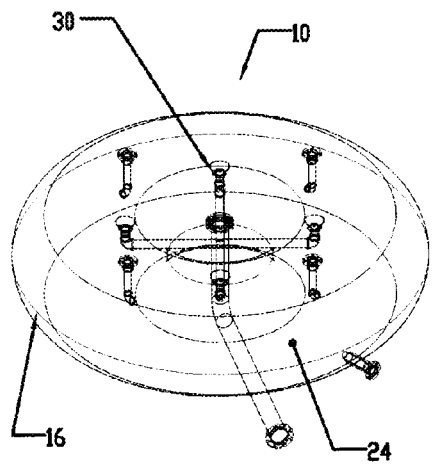
FIG. 6A is a schematic perspective view of a media bed filter for filtering fine particles from a raw liquid flow in accordance with another embodiment.
Figure 6B:
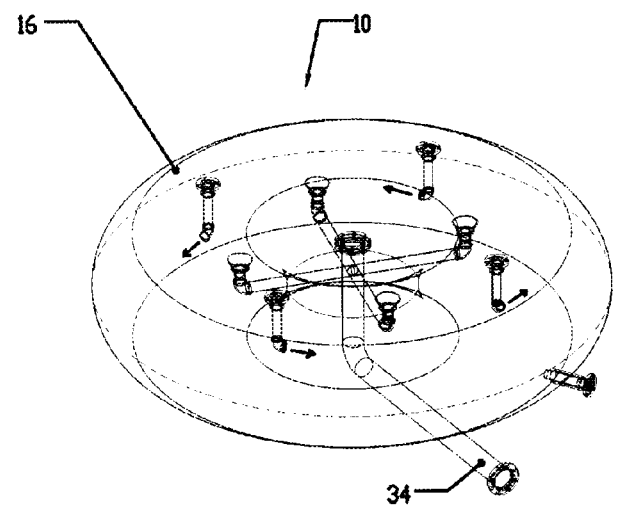
FIG. 6B is another perspective view of the media bed filter of FIG. 6A.
Figure 6C:
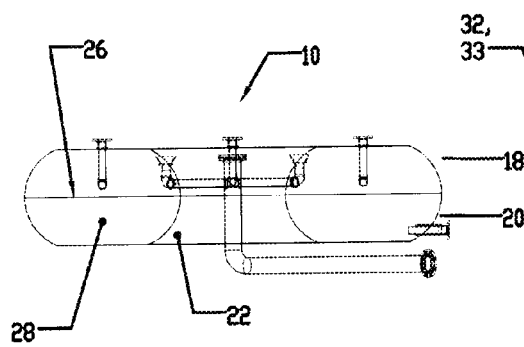
FIG. 6C is an elevation view of the media bed filter of FIG. 6A.
Figure 6D:
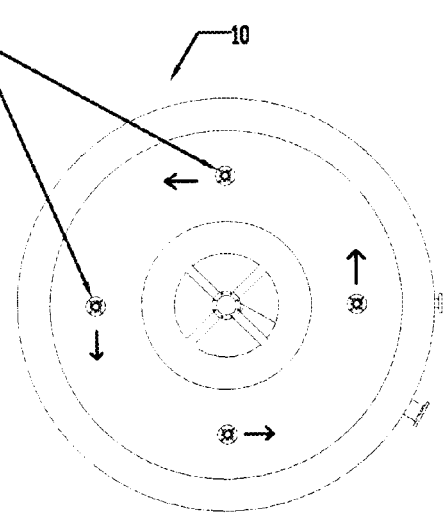
FIG. 6D is a top plan view of the media bed filter of FIG. 6A.
Figure 7A:
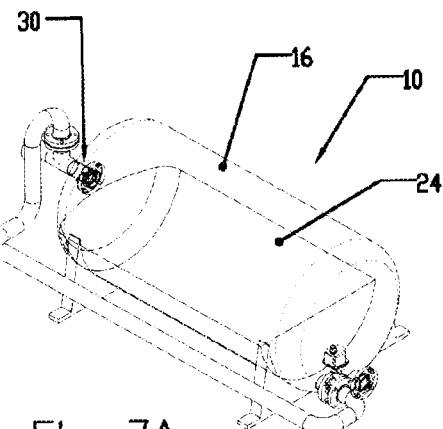
FIG. 7A is a schematic perspective view of a media bed filter for filtering fine particles from a raw liquid flow in accordance with another embodiment.
Figure 7D:
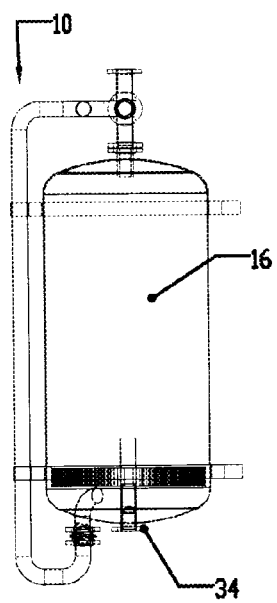
FIG. 7D is another elevation view of the media bed filter of FIG. 7A.
Figure 7B:
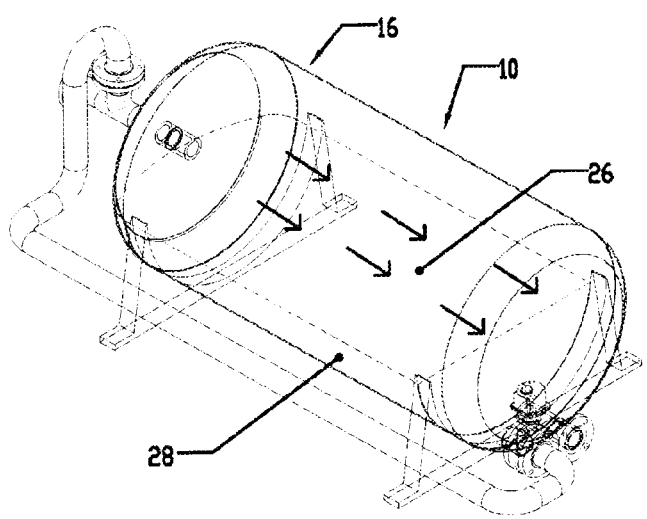
FIG. 7B is another perspective view of the media bed filter of FIG. 7A.
Figure 7C:
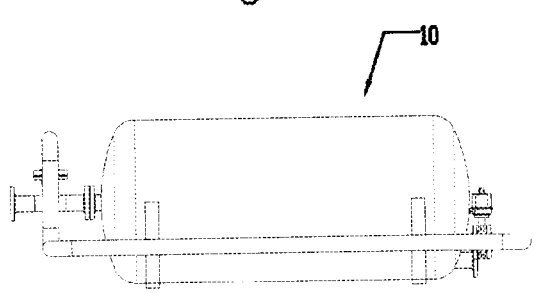
FIG. 7C is an elevation view of the media bed filter of FIG. 7A.
Figure 7E:
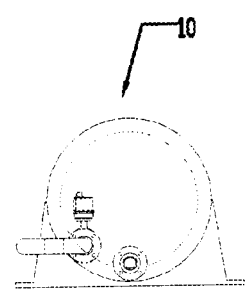
FIG. 7E is a side elevation view of the media bed filter of FIG. 7A.

In embodiments, there are disclosed media bed filters for filtering fine particles from a raw liquid flow and method of filtering fine particles from a raw liquid flow.

Referring now to the drawings and more particularly from FIGS. 2A-20, there is shown media bed filters 10 for filtering fine particles (not shown) from a raw liquid flow. The media bed filters 10 each includes a tank 16 which has a top portion 18 and a bottom portion 20. The bottom portion 20 defines a bottom surface 22 for receiving a media bed 24. The media bed 24 includes a supporting media 28 to be disposed on the bottom surface 22 and a filtering media 26 for covering the supporting media 28. It is to be noted, as described above, that the top portion 18 of the tank 16 is being above the filtering media 26 of the media bed 24. The media bed filter 10 further includes a raw liquid inlet 30 in fluid communication with a nozzle configuration 32 which is located in the top portion 18 of the tank 16. The nozzle configuration 32 provides the raw liquid flow in the tank 16 in the form of a plurality of jets (not shown) at a directional velocity substantially equal or greater to a disengagement velocity of the filtering media 26.

Referring now to FIGS. 4A-4D, 5A-5D, 10, 11, 12A-12C, 13, 15, 16, 17, 18, 19 and 20, there is shown that the nozzle configuration 32 comprises a plurality of nozzles 33, where each one of the plurality of nozzles 33 is for providing the raw liquid flow in the tank 16 in the form of a respective one of the plurality of jets at the directional velocity towards the filtering media 26.

Referring now to FIGS. 4A-4D, 5A-5D, 10, 11, 12A-12C, 13, 15, 16, 17, 18, 19 and 20, there is shown that the plurality of nozzles 33 of the media bed filter 10 are oriented in opposite directions.

Referring now to FIGS. 2A-2D, 4A-4D, 5A-5D, 6A-6D, 8, 10, 11, 12A-12C and 13), there is shown that the top portion 18 of the tank 16 defines a top portion surface 19 and that the nozzle configuration 32 is oriented for providing the plurality of jets towards the top portion surface 19 of the tank 16. This nozzle configuration 32 provides the raw liquid flow in the tank 16 at a parallel velocity substantially equal or greater to the disengagement velocity of the filtering media 26.

Referring now to FIGS. 2A-2D, 3A-3D, 4A-4D, 5A-5D, 6A-6D, 8, 9, 10, 11, 13, and 15-20, there is shown that the nozzle configuration 32 is located above the raw liquid inlet 30 within the top portion 18 of the tank 16 (FIGS. 10 and 13) or located below the raw liquid inlet 30 within the top portion 18 of the tank 16 (FIGS. 2A-2D, 3A-3D, 4A-4D, 5A-5D, 6A-6D, 8, 9, 11 and 15-20).

Referring now to FIGS. 3A-3D, there is shown that the nozzle configuration 32 of the media bed filter 10 is oriented for providing the plurality of jets perpendicularly towards the filtering media 26 of the media bed 24.

Figure 19:
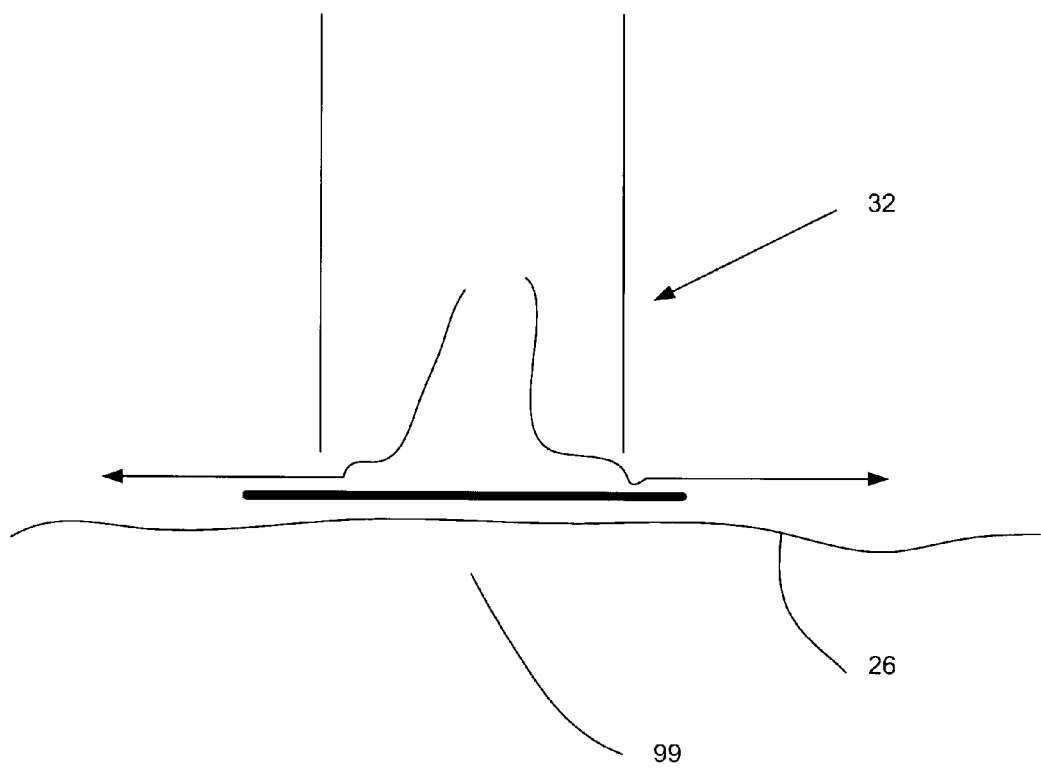
FIG. 19 is a schematic elevation view of a nozzle configuration of a media bed filter for filtering fine particles from a raw liquid flow in accordance with another embodiment.
Figure 20:
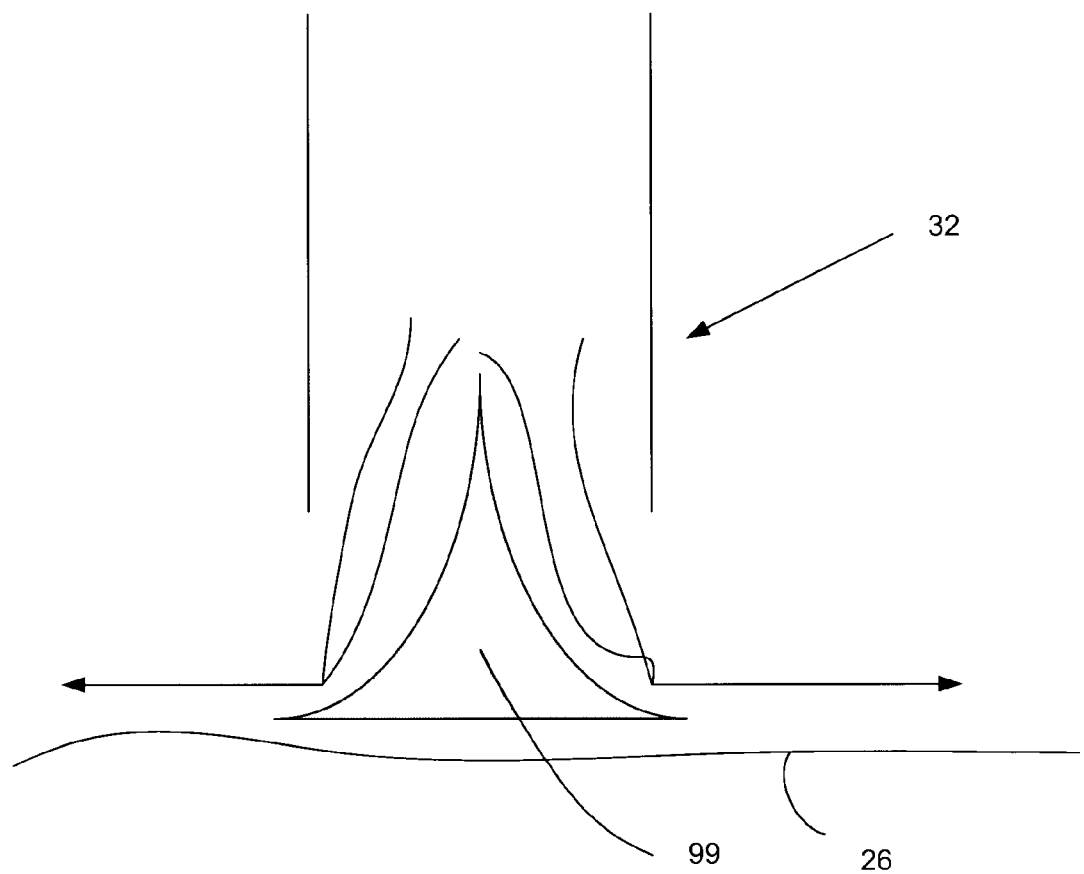
FIG. 20 is a schematic elevation view of a nozzle configuration of a media bed filter for filtering fine particles from a raw liquid flow in accordance with another embodiment.

Referring now to FIGS. 19-20, the media bed filter 10 includes a baffle 90 located in the top portion 18 of the tank 16 and between the nozzle configuration 32 and the filtering media 26. More particularly, the baffle 90 is located substantially above the filtering media 26. This configuration of the nozzle configuration 32 and the baffle 90 provides the raw liquid flow to enter the tank 16 at a parallel velocity substantially equal or greater to the disengagement velocity of the filtering media 26.

Referring now to FIGS. 2A-2D, 3A-3D, 6A-6D, 8 and 9, there is shown that the media bed filter 10 includes a plurality of raw liquid inlets 30. Each one of the plurality of raw liquid inlets 30 is in fluid communication with a respective nozzle configuration 32.

Referring now to FIGS. 3A-3D, 4A-4D, 5A-5D and 9, there is shown that the nozzle configuration 32 of the media bed filter 10 is oriented in an upward direction for providing the plurality of jets to enter the tank 16 in an upwardly direction and/or oriented in a downwardly direction for providing the plurality of jets to enter the tank 16 in a downwardly direction (FIGS. 3A-3D, 4A-4D, 5A-5D and 9).

Referring now to FIGS. 6A-6D, 7A-7E and 15-20, there is shown that the nozzle configuration 32 of the media bed filter 10 is oriented for providing the plurality of jets horizontally towards the filtering media 26 of the media bed 24. Indeed, the nozzle configuration 32 is located in the top portion 18 of the tank 16 at substantially the same level of the filtering media 26.

According to an embodiment, the nozzles 33 may define a shape which includes at least one of, without limitation, an elbow-like shape, a straight-like shape, a curved-like shape, a regular polygonal-like shape, a segmented-like shape, an irregular polygonal-like shape, a circular-like shape, an angular-like shape, any combination and the like.

Figure 14:
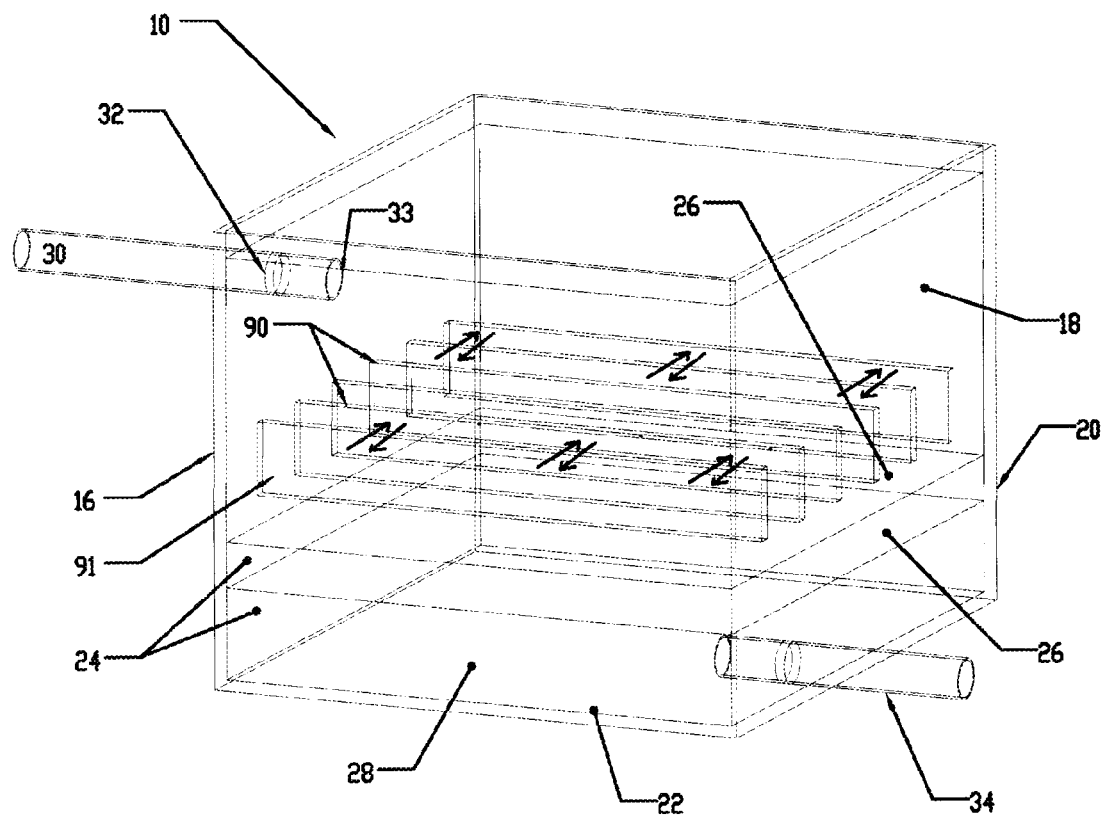
FIG. 14 is a perspective view of a media bed filter for filtering fine particles from a raw liquid flow in accordance with another embodiment, where the tank is an open-tank.

Referring now to FIGS. 9, 14, 19 and 20, there is shown that the media bed filter 10 includes one or more baffles 90 within the top portion 18 of the tank 16 for receiving the plurality of jets. The configuration of the baffle(s) 90 and of the nozzle configuration 32 thereby provides the raw liquid flow in the tank 16 at a parallel velocity substantially equal or greater to the disengagement velocity of the filtering media 26. As shown in FIG. 14, the baffles 90 of the media bed filter 10 are located substantially above the filtering media 26, parallel and laterally distant from each other. Moreover, the plurality of baffles 90 (FIG. 14) are displaceable baffles (i.e., electrically displaceable).

More particularly and according to an embodiment, FIGS. 2A-2D show a media bed filter 10 which includes two raw liquid inlets 30. Each one of the raw liquid inlets 30 is in fluid communication with a respective nozzle configuration 32. The nozzle configurations 32 are oriented in the same direction and substantially towards the top portion surface 19 of the tank 16. This configuration may allow the plurality of jets to circulate towards the top portion surface 19 of the tank 16, then to circulate along the top portion surface 19, which thereby allows at least a portion of the plurality of jets to circulate at a parallel velocity substantially equal or greater to the disengagement velocity of the filtering media 24. The nozzles 33 define a curved-like shape for allowing the raw liquid flow to circulate towards the top portion surface 19.

According to another embodiment, FIGS. 3A-3D show a media bed filter 10 which includes four raw liquid inlets 30. Each one of the raw liquid inlets 30 is in fluid communication with a respective nozzle configuration 32. The nozzle configurations 30 are oriented in the same direction and substantially towards the filtering media 26 of the tank 16 at a specific distance (i.e., a distance such that the plurality of jets will not dig into the filtering media 26) from the filtering media 26. This configuration may allow the plurality of jets to circulate towards the filtering media 26 of the tank 16, which thereby allows at least a portion of the plurality of jets to circulate at a parallel velocity substantially equal or greater to the disengagement velocity of the filtering media 26. The nozzles 33 define a straight-like shape for allowing the raw liquid flow to circulate towards the filtering media 26.

According to another embodiment, FIGS. 4A-4D show a media bed filter 10 which includes one raw liquid inlet 30. The raw liquid inlet 30 is in fluid communication with a respective nozzle configuration 32. The nozzle configuration 32 includes three nozzles 33 which are oriented in opposite directions and substantially towards the top portion surface 19 of the tank 16. This configuration may allow the plurality of jets to circulate towards the top portion surface 19 of the tank 16, then to circulate along the top portion surface 19, which thereby allows at least a portion of the plurality of jets to circulate at a parallel velocity substantially equal or greater to the disengagement velocity of the filtering media 26. Since the nozzles 33 are substantially at the same level of the filtering media 26, this configuration may also allow the plurality of jets to circulate at a parallel velocity substantially equal or greater to the disengagement velocity of the filtering media 26 when they exit the nozzles 33. The nozzles 33 define an angular-like shape for allowing the raw liquid flow to circulate towards the top portion surface 19 and/or the filtering media 26.

According to another embodiment, FIGS. 5A-5D show a media bed filter 10 which includes one raw liquid inlet 30. The raw liquid inlet 30 is in fluid communication with a respective nozzle configuration 32. The nozzle configuration 32 includes two nozzles 33 which are oriented in opposite directions and substantially towards the top portion surface 19 of the tank 16. This configuration may allow the plurality of jets to circulate towards the top portion surface 19 of the tank 16, then to circulate along the top portion surface 19, which thereby allows at least a portion of the plurality of jets to circulate at a parallel velocity substantially equal or greater to the disengagement velocity of the filtering media 26. Since the nozzles 33 are substantially at the same level of the filtering media 26, this configuration may also allow the plurality of jets to circulate at a parallel velocity substantially equal or greater to the disengagement velocity of the filtering media 26 when they exit the nozzles 33. The nozzles 33 define an angular-like shape for allowing the raw liquid flow to circulate towards the top portion surface 19 and/or the filtering media 26.

According to another embodiment, FIGS. 6A-6D show a media bed filter 10 which includes a plurality of raw liquid inlets 30. The raw liquid inlets 30 are in fluid communication with a respective nozzle configuration 32. The nozzle configurations 32 are oriented in a direction such that it allows the raw liquid flow to circulate within a tank 16 having a donough-like shape. The nozzle configurations 32 are also substantially oriented towards the top portion surface 19 of the tank 16. This configuration may allow the plurality of jets to circulate towards the top portion surface 19 of the tank 16, then to circulate along the top portion surface 19, which thereby allows at least a portion of the plurality of jets to circulate at a parallel velocity substantially equal or greater to the disengagement velocity of the filtering media 26. Since the nozzle configurations 32 are substantially at the same level of the filtering media 26, this configuration may also allow the plurality of jets to circulate at a parallel velocity substantially equal or greater to the disengagement velocity of the filtering media 26 when they exit the nozzle configurations 32. The nozzles 33 define a straight-like shape for allowing the raw liquid flow to circulate towards the top portion surface 19 and/or the filtering media 26.

According to another embodiment, FIGS. 7A-7E show a media bed filter 10 which includes one raw liquid inlet 30. The raw liquid inlet 30 is in fluid communication with a respective nozzle configuration 32. Since the nozzle configuration 32 is substantially at the same level of the filtering media 26, this configuration may also allow the plurality of jets to circulate at a parallel velocity substantially equal or greater to the disengagement velocity of the filtering media 26 when they exit the nozzle configuration 32. The nozzles 33 define a straight-like shape for allowing the raw liquid flow to circulate along the filtering media 26. It is to be noted that the filtering media 26 that is utilized in this filtering media filter 10 may be recycled via an adapted piping system. It is to be noted that on FIG. 7B, there is shown that the filtering media 26 adopts a longitudinal movement in the tank 16. The filtering media 26 (i.e., micro sand) may be recuperated at the end of the tank 16 via a hydraulic mechanism or a mechanic mechanism (not shown). Thus, the filtering media 26 is brought back to another filtering media inlet.

Figure 8:
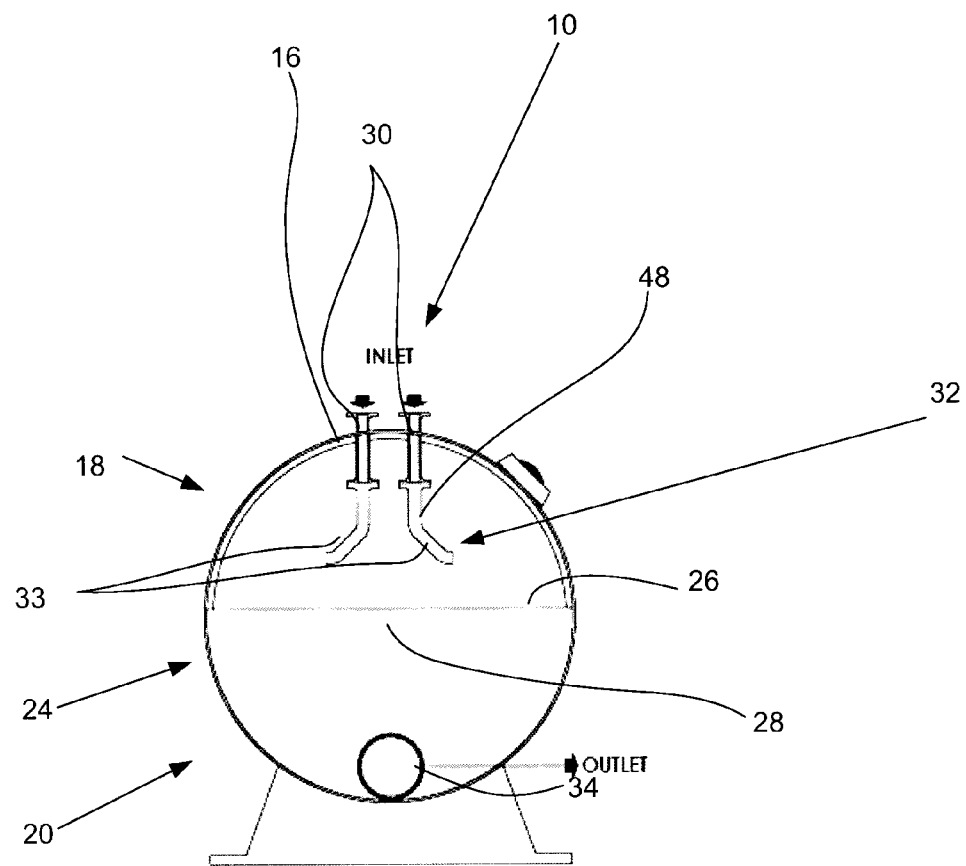
FIG. 8 is a side elevation view of a media bed filter for filtering fine particles from a raw liquid flow in accordance with another embodiment.

According to another embodiment, FIG. 8 shows a media bed filter 10 which includes two raw liquid inlets 30. The raw liquid inlets 30 are in fluid communication with a respective nozzle configuration 32. The nozzle configurations 32 are oriented in opposite directions and substantially towards the top portion surface 19 of the tank 16. This configuration may allow the plurality of jets to circulate towards the top portion surface 19 of the tank 16, then to circulate along the top portion surface 19, which thereby allows at least a portion of the plurality of jets to circulate at a parallel velocity substantially equal or greater to the disengagement velocity of the filtering media 26. The nozzles define an angular-like shape for allowing the raw liquid flow to circulate towards the top portion surface 19 and/or the filtering media 26.

Figure 9:
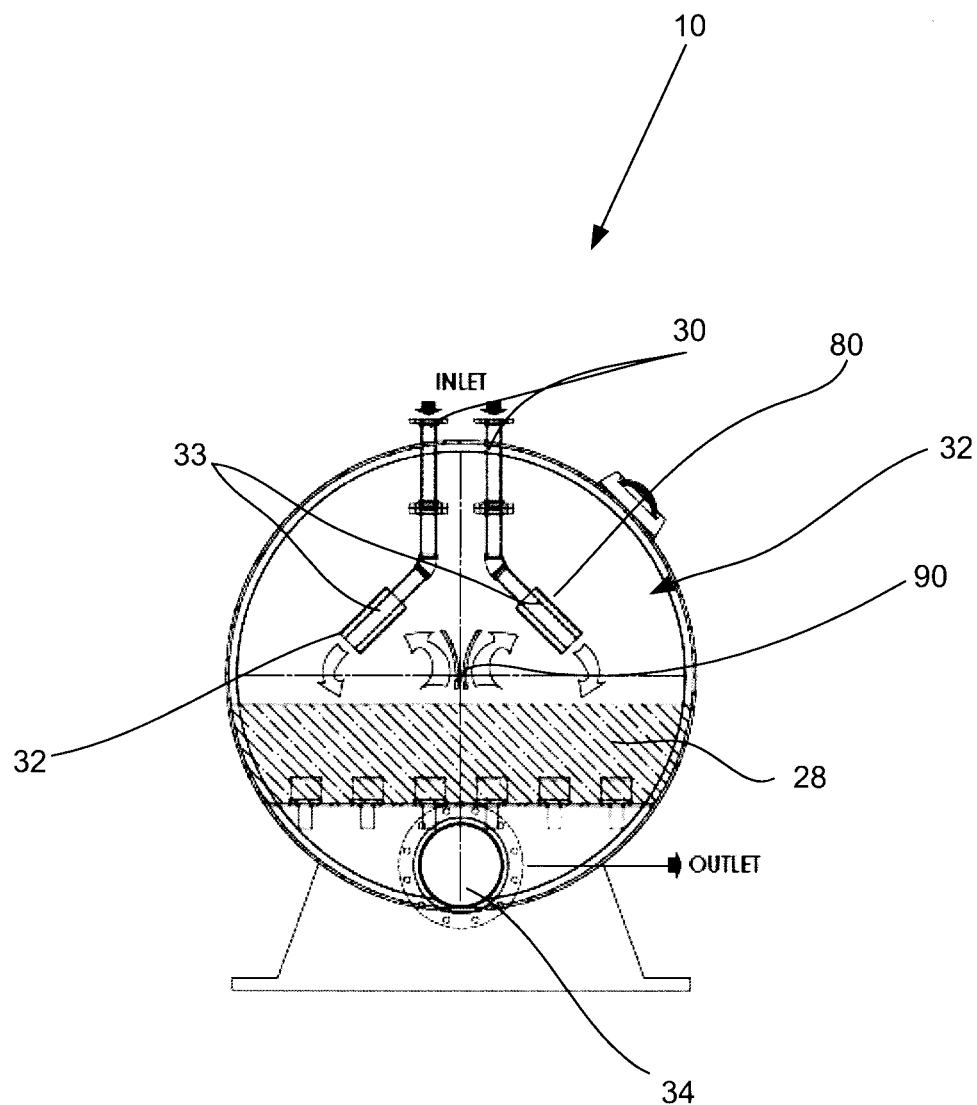
FIG. 9 is a side view of a media bed filter for filtering fine particles from a raw liquid flow showing the supporting media bed as a rigid bed with openings in accordance with another embodiment.

According to another embodiment, FIG. 9 shows a media bed filter 10 which includes two raw liquid inlets 30. The raw liquid inlets 30 are in fluid communication with a respective nozzle configuration 32. The nozzle configurations 32 are oriented in opposite directions and substantially towards the top portion surface 19 of the tank 16. This configuration may allow the plurality of jets to circulate towards the top portion surface 19 of the tank, then to circulate along the top portion surface 19, which thereby allows at least a portion of the plurality of jets to circulate at a parallel velocity substantially equal or greater to the disengagement velocity of the filtering media 26. The nozzles 33 define an angular-like shape for allowing the raw liquid flow to circulate towards the top portion surface 19 and/or the filtering media 26. The media bed filter 10 of FIG. 9 also includes two baffles 90 for allowing the filtering media 26 to move in an optimized manner for allowing filtration of the fine particles and venturi portions 80 around at least a portion of the nozzle configurations 32. The venturi portions 80 may recycle the filtering media faster and/or more efficiently (i.e., the venturi portions 80 may optimize recycling of the filtering media 26).

In FIG. 9, the supporting media 28 is a rigid supporting layer defining openings (i.e., such as a false floor).

Figure 10:
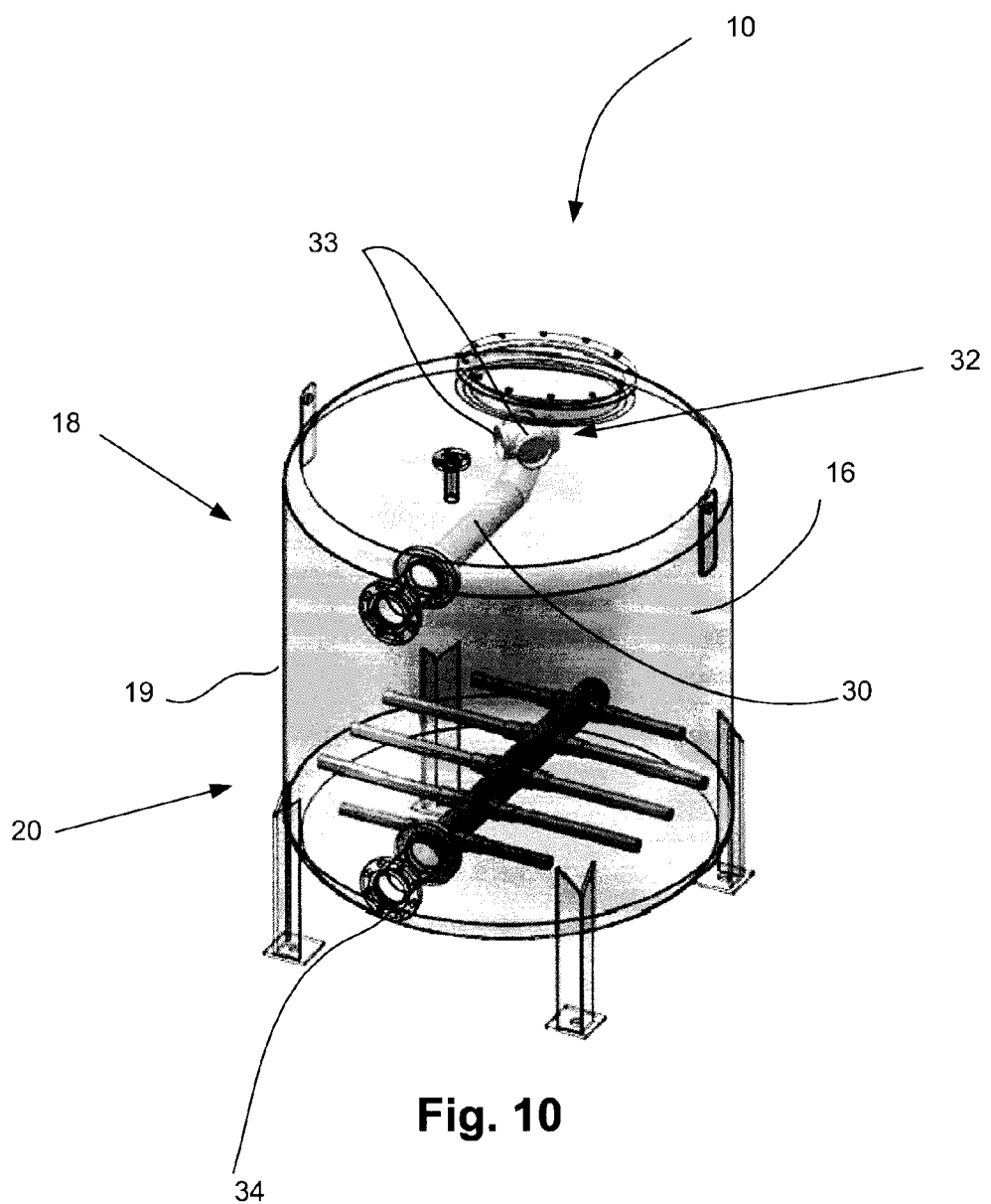
FIG. 10 is a schematic perspective view of a media bed filter for filtering fine particles from a raw liquid flow in accordance with another embodiment.
Figure 11:
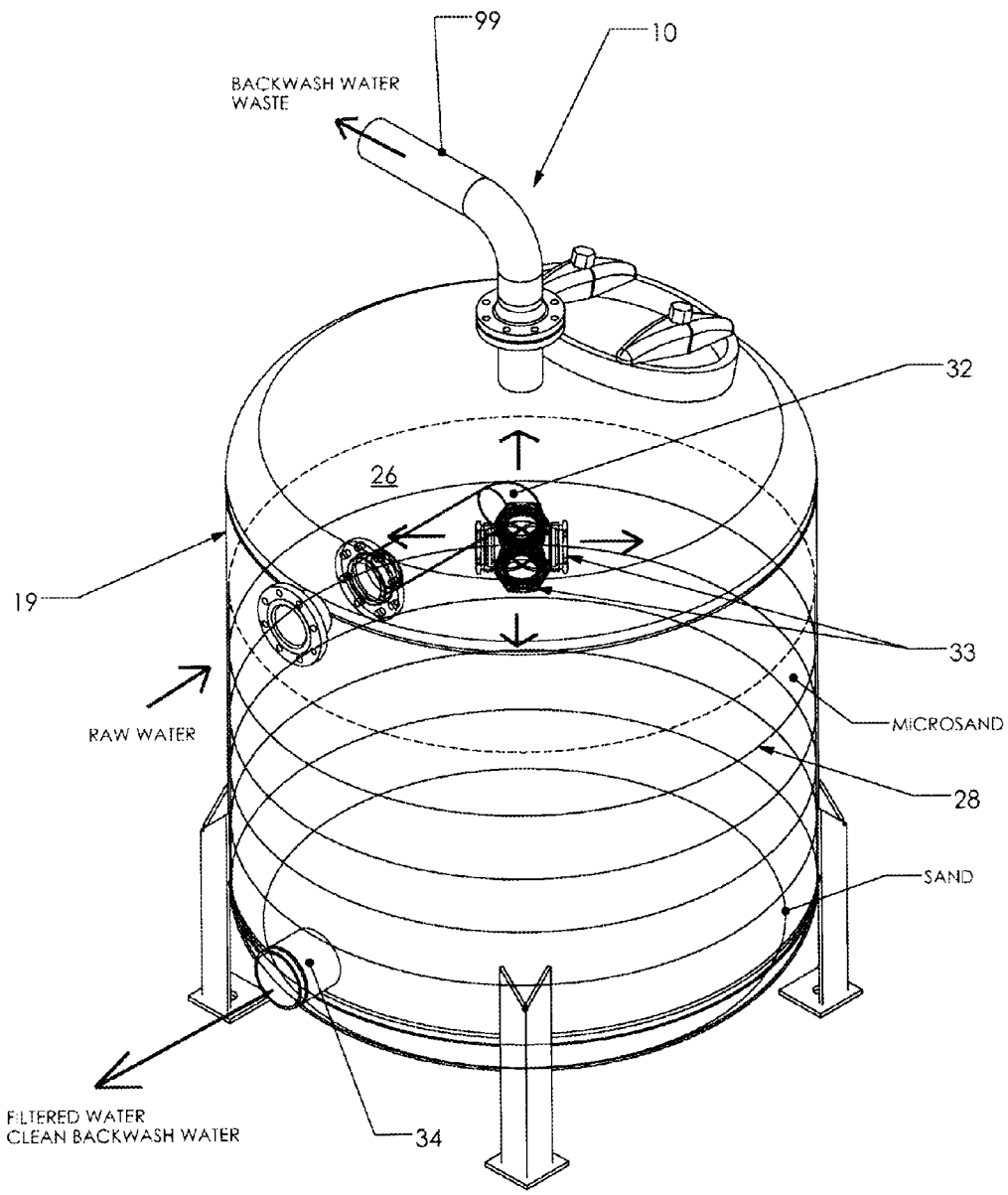
FIG. 11 is a schematic perspective view of a media bed filter for filtering fine particles from a raw liquid flow in accordance with another embodiment.

According to another embodiment, FIGS. 10 and 11 shows media bed filters 10 which includes one raw liquid inlet 30. The raw liquid inlet 30 is in fluid communication with a respective nozzle configuration 32. The nozzle configuration 32 includes four upwardly (FIG. 10) or downwardly (FIG. 11) oriented nozzles 33 which are oriented in opposite directions and substantially towards the top portion surface 19 of the tank 16. This configuration may allow the plurality of jets to circulate towards the top portion surface 19 of the tank 16, then to circulate along the top portion surface 19, which thereby allows at least a portion of the plurality of jets to circulate at a parallel velocity substantially equal or greater to the disengagement velocity of the filtering media 26. The nozzles 33 define a straight-like shape for allowing the raw liquid flow to circulate towards the top portion surface 19 and/or the filtering media 26. Additionally, since the nozzle configuration 33 is substantially at the same level of the filtering media 26, this configuration may also allow the plurality of jets to circulate at a parallel velocity substantially equal or greater to the disengagement velocity of the filtering media 26 when they exit the nozzle configuration 32.

Figure 12A:
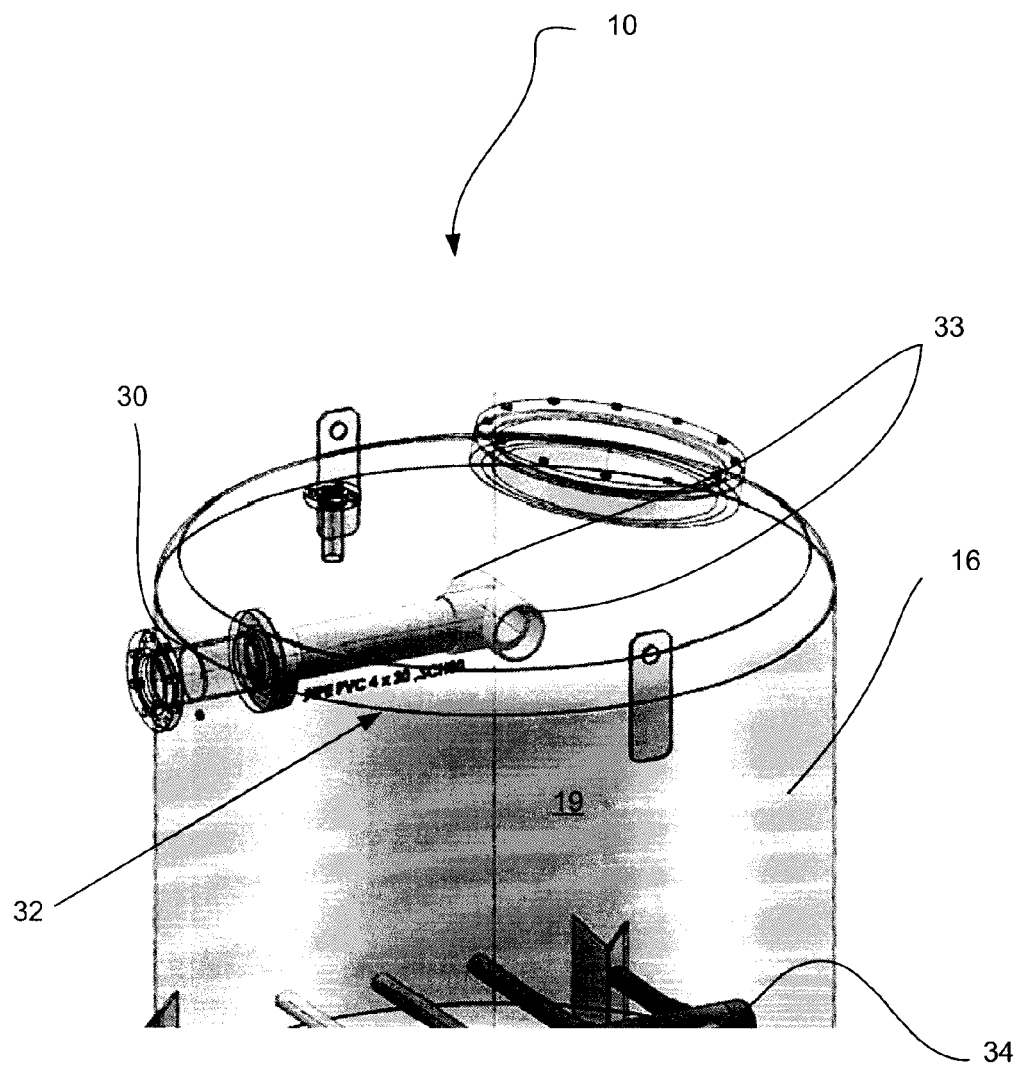
FIG. 12A is a schematic perspective view of a media bed filter for filtering fine particles from a raw liquid flow in accordance with another embodiment.
Figure 12B:
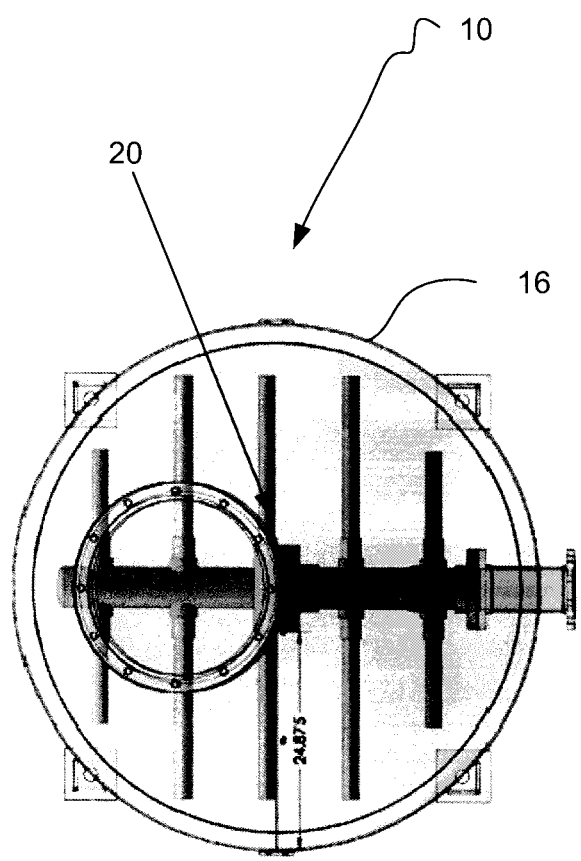
FIG. 12B is a top plan view of the media bed filter of FIG. 12A.
Figure 12C:
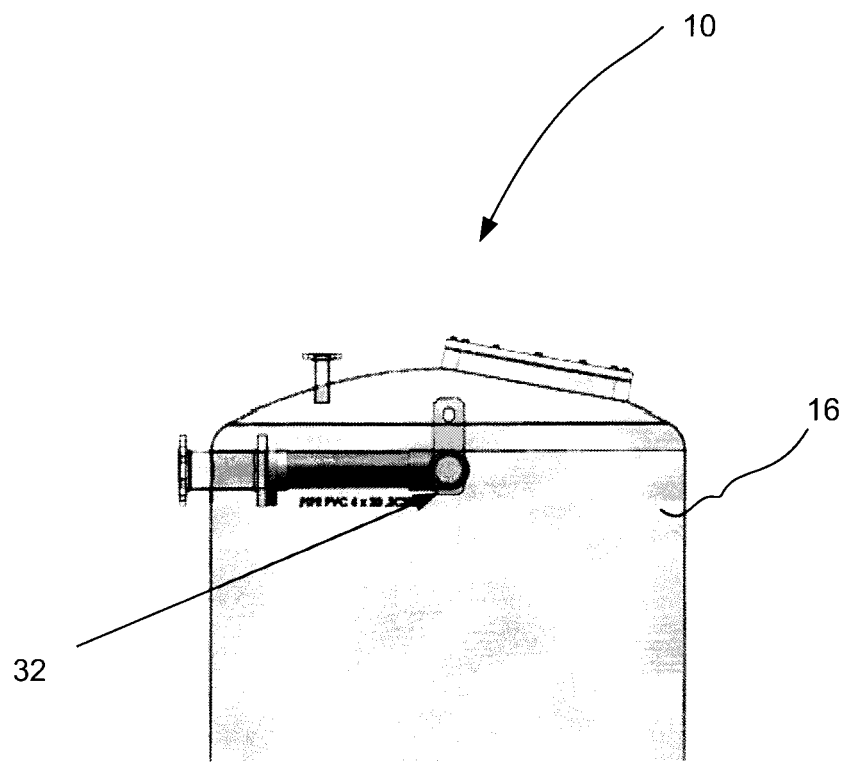
FIG. 12C is a side plan view of the media bed filter of FIG. 12A.

According to another embodiment, FIGS. 12A-12C show a media bed filter 10 which includes one raw liquid inlet 30. The raw liquid inlet 30 is in fluid communication with a respective nozzle configuration 32. The nozzle configuration 32 includes two nozzles 33 which are oriented in opposite directions and substantially towards the top portion surface 19 of the tank 16. This configuration may allow the plurality of jets to circulate towards the top portion surface 19 of the tank 16, then to circulate along the top portion surface 19, which thereby allows at least a portion of the plurality of jets to circulate at a parallel velocity substantially equal or greater to the disengagement velocity of the filtering media 26. The nozzles 33 define a straight-like shape for allowing the raw liquid flow to circulate towards the top portion surface 19 and/or the filtering media 26.

Figure 13:
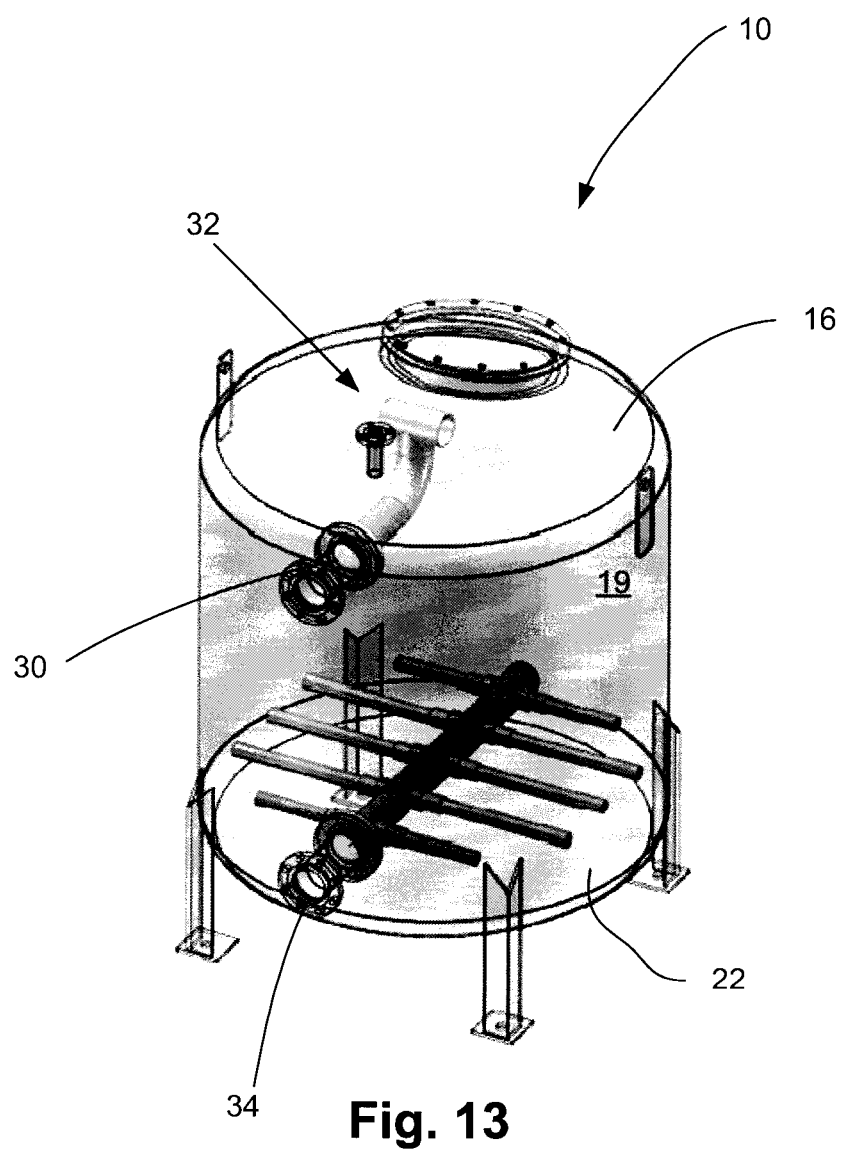
FIG. 13 is a schematic perspective view of a media bed filter for filtering fine particles from a raw liquid flow in accordance with another embodiment.

According to another embodiment, FIG. 13 shows a media bed filter 10 which includes one raw liquid inlet 30. The raw liquid inlet 30 is in fluid communication with a respective nozzle configuration 32. The nozzle configuration 32 includes two upwardly oriented nozzles 33 which are oriented in opposite directions and substantially towards the top portion surface 19 of the tank 16. This configuration may allow the plurality of jets to circulate towards the top portion surface 19 of the tank 16, then to circulate along the top portion surface 19, which thereby allows at least a portion of the plurality of jets to circulate at a parallel velocity substantially equal or greater to the disengagement velocity of the filtering media 26. The nozzles 33 define a straight-like shape for allowing the raw liquid flow to circulate towards the top portion surface 19 and/or the filtering media 26.

According to another embodiment, FIG. 14 shows a media bed filter 10 which includes an opened tank 16. The media bed filter 10 includes one raw liquid inlet 30. The raw liquid inlet 30 is in fluid communication with a respective nozzle configuration 32. The nozzle configuration 32 is oriented substantially towards the top portion surface 19 of the tank 16. The media bed filter 10 further includes a plurality of baffles 90. Each one of the plurality of baffles 90 are located substantially above the filtering media 26, parallel, and laterally distant from each other. This configuration may allow the plurality of jets to circulate towards the baffles 90 of the tank 16, then to circulate along the baffle walls 91, which thereby allows at least a portion of the plurality of jets to circulate at a parallel velocity substantially equal or greater to the disengagement velocity of the filtering media 26.

Figure 15:
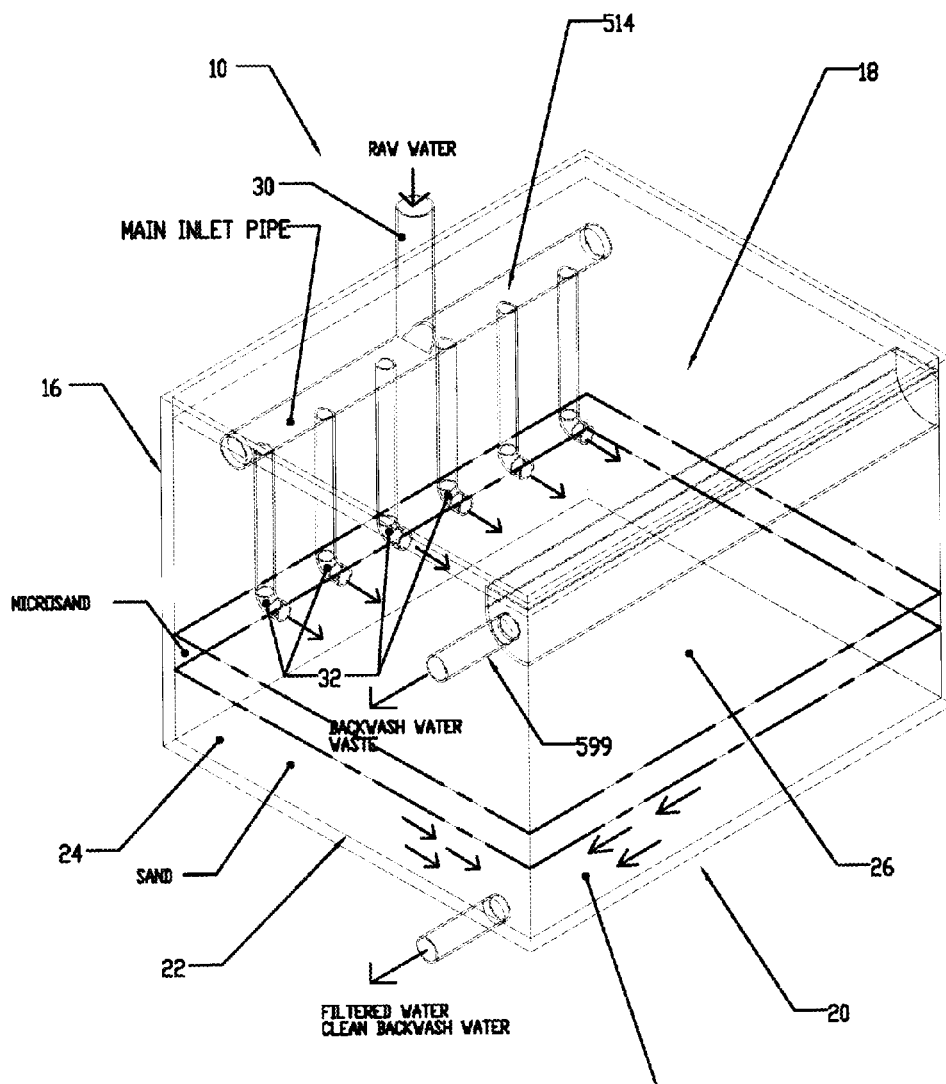
FIG. 15 is a schematic perspective view of a media bed filter for filtering fine particles from a raw liquid flow in accordance with another embodiment, where the tank is an open-tank.
Figure 16:
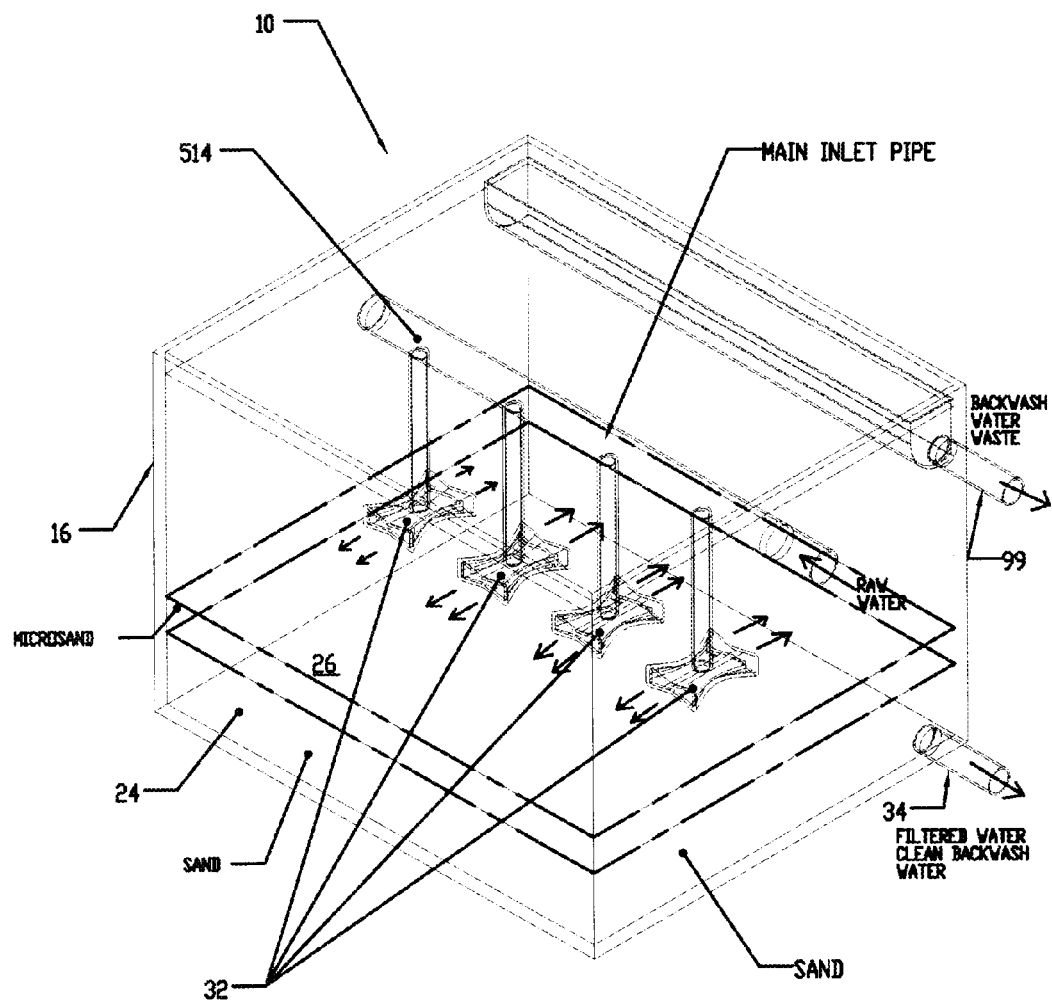
FIG. 16 is a schematic perspective view of a media bed filter for filtering fine particles from a raw liquid flow in accordance with another embodiment, where the tank is an open-tank
Figure 17:
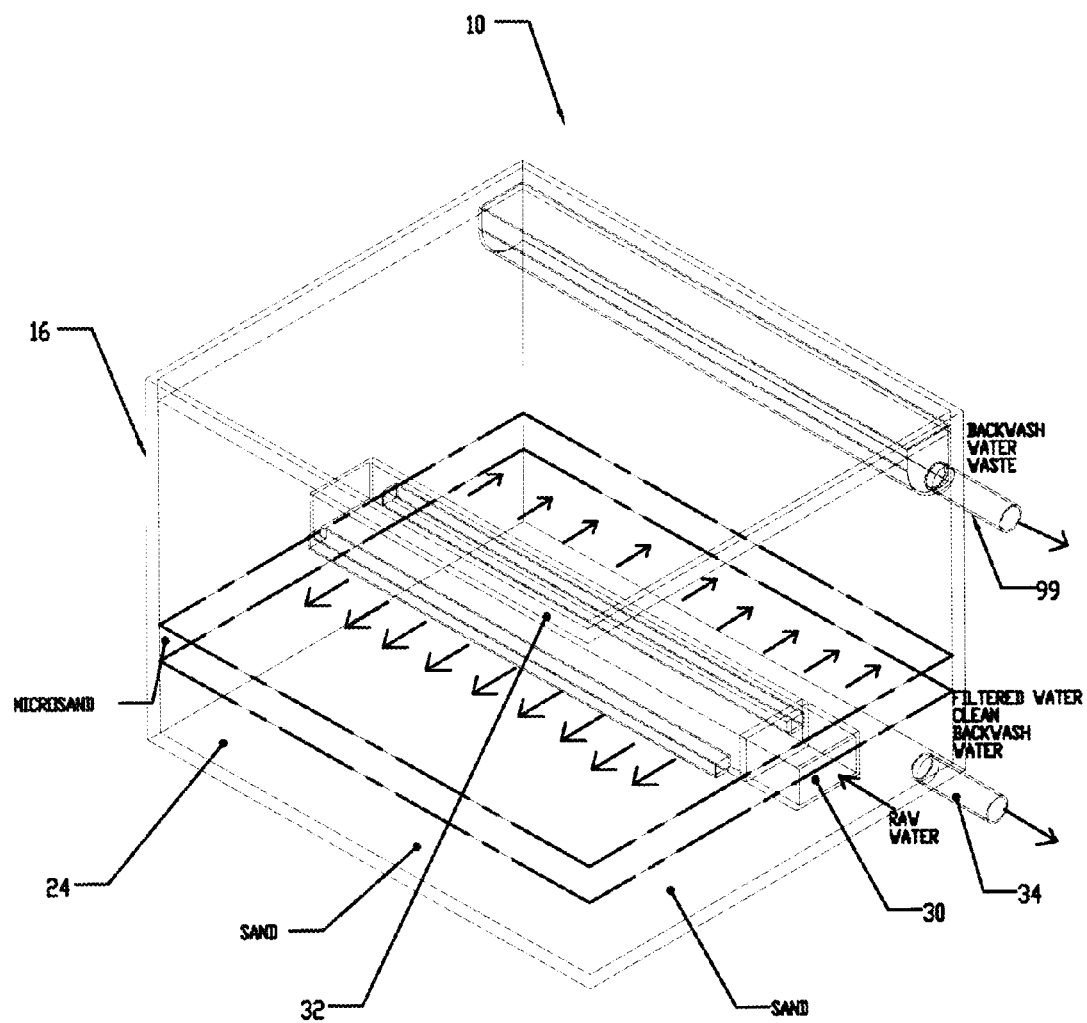
FIG. 17 is a schematic perspective view of a media bed filter for filtering fine particles from a raw liquid flow in accordance with another embodiment, where the tank is an open-tank
Figure 18:
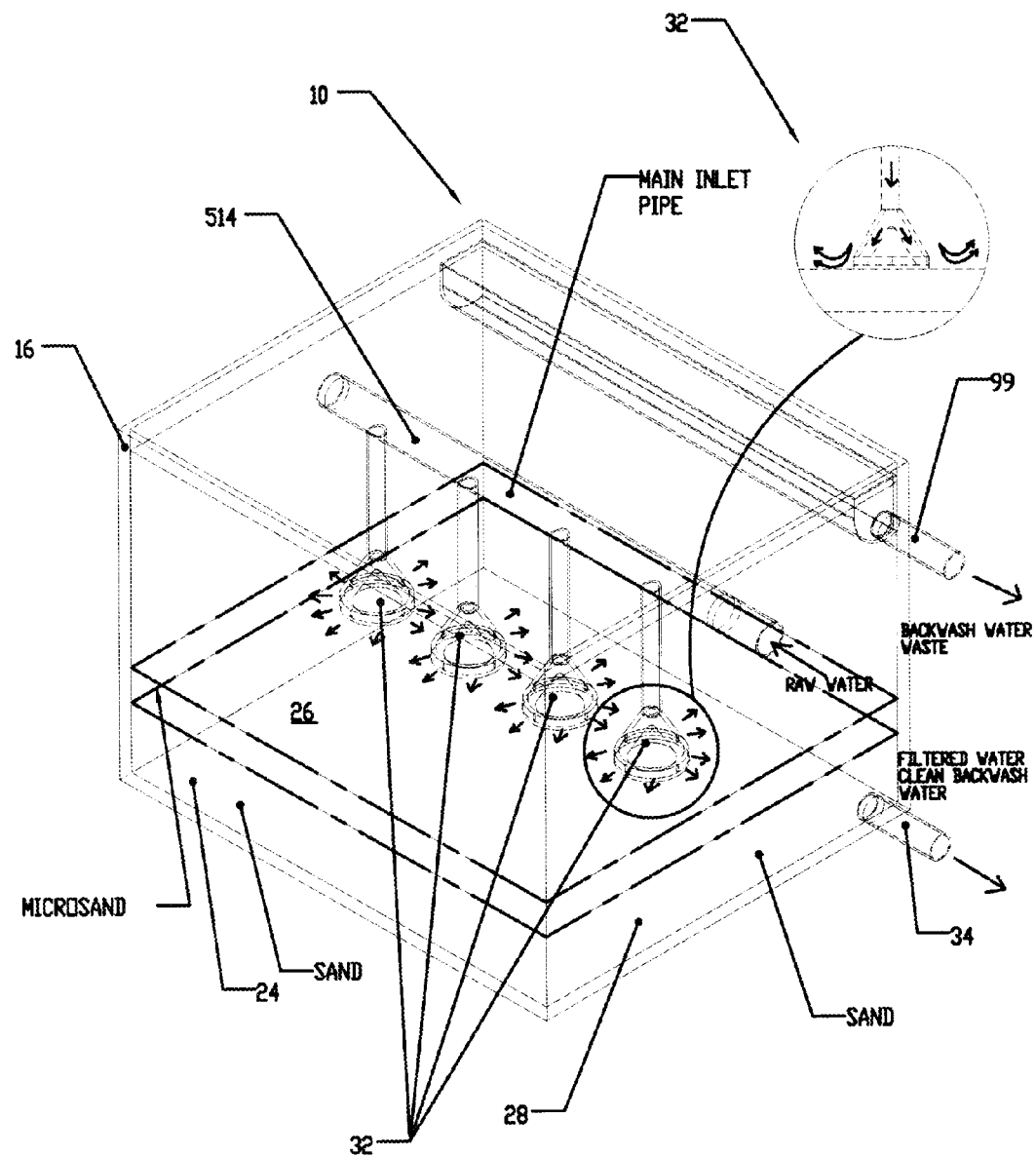
FIG. 18 is a schematic perspective view of a media bed filter for filtering fine particles from a raw liquid flow in accordance with another embodiment, where the tank is an open-tank.

According to other embodiments, FIGS. 15-18 show media bed filters 10 which include one raw liquid inlet 30. The raw liquid inlet 30 is in fluid communication with a plurality of nozzle configurations 32. In FIG. 15, the nozzles 33 are oriented in the same direction and substantially at the same level of the filtering media 26. This configuration may also allow the plurality of jets to circulate at a parallel velocity substantially equal or greater to the disengagement velocity of the filtering media 26 when they exit the nozzles 33. In FIGS. 16-18, the nozzles 33 are oriented in opposite directions and substantially at the same level of the filtering media 26. This configuration may also allow the plurality of jets to circulate at a parallel velocity substantially equal or greater to the disengagement velocity of the filtering media 26 when they exit the nozzles 33. As further shown in FIG. 15, the nozzles 33 are proximate to the filtering media 26. As shown in FIG. 16, the nozzles 33 are proximate to the filtering media 26 and are arranged in the middle of the tank 16 such as to allow the plurality of jets to circulate towards opposite directions. As shown in FIG. 17, the nozzles 33 are proximate to the filtering media 26 and are arranged in the middle of the tank 16 and along the length of the tank 16 such as to allow the plurality of jets to circulate towards opposite directions and along the length of the tank 16. As shown in FIG. 18, the nozzles 33 are proximate to the filtering media 26 and are arranged in the middle of the tank 16 such as to allow the plurality of jets to circulate towards a plurality of directions (i.e., the nozzle configurations 32 includes circular nozzles 33).

Referring now to FIGS. 19-20, the media bed filter includes a baffle 90 located in the top portion of the tank and between the nozzle configuration 32 and the filtering media 26. More particularly, the baffle 90 is located substantially above the filtering media 26 for providing the raw liquid flow in the tank 16 at a parallel velocity substantially equal or greater to the disengagement velocity of the filtering media 26.

It is to be noted that the filter media filter 10 as described above includes one or a plurality of a filtered liquid outlets 34. The filtered liquid outlets 34 are located in proximity to the bottom portion 20 of the tank 16 and allow a filtered liquid flow to exit the tank 16. The media bed filter 10 may further include at least one backwash liquid outlet 99 which is located in the top portion 18 of the tank 16 for removing the fines particles from the tank 16 during a backwash sequence. It is to be mentioned that the backwash liquid outlet 99 and the raw liquid inlet 30 may be the same for allowing the raw liquid inlets 30 to provide the plurality of jets in the tank 16 and also to remove the fine particles from the tank 16 during the backwash sequence (FIGS. 2A-2D, 3A-3D, 4A-4D, 5A-5B, 6A-6B, 8, 9, 10, 12A-12B and 13).

According to another embodiment, there is provided a method for filtering fine particles from a raw liquid flow in a tank 16 supporting a filtering media 26. The method includes the steps of 1—receiving the raw liquid flow with fine particles; and 2—providing the raw liquid flow in the top portion 18 of the tank 16 in the form of a plurality of jets at a directional velocity substantially equal or greater to a disengagement velocity of the filtering media 26.

According to another embodiment, the step of providing the raw liquid flow in the top portion 18 of the tank 16 in the form of a plurality of jets comprises the step of providing the raw liquid flow in the top portion 18 of the tank 16 in the form of a plurality of jets oriented in opposite directions, thereby providing the raw liquid flow in the tank 16 at a parallel velocity substantially equal or greater to the disengagement velocity of the filtering media 26.

According to another embodiment, the step of the providing the raw liquid flow in the top portion 18 of the tank 16 in the form of a plurality of jets comprises the step of providing the raw liquid flow in the top portion 18 of the tank 16 in the form of a plurality of jets towards a top portion surface 19 of the tank 16, thereby providing the raw liquid flow in the tank 16 at a parallel velocity substantially equal or greater to the disengagement velocity of the filtering media 26.

According to another embodiment, the step of providing the raw liquid flow in the top portion 18 of the tank 16 in the form of a plurality of jets comprises the step of providing the plurality of jets perpendicularly towards the filtering media 26 of the media bed 24.

According to a further embodiment, the step of the providing the raw liquid flow in the top portion 18 of the tank 16 in the form of a plurality of jets comprises the step of providing the raw liquid flow in the top portion 18 of the tank 16 in the form of a plurality of jets at substantially the same level of the filtering media 26, thereby providing the raw liquid flow in the tank 16 at a parallel velocity substantially equal or greater to the disengagement velocity of the filtering media 26.

It is also to be noted that these configurations of the media bed filters 10 may provide a surface filtration which keeps the fine particles above the filtering media 26 of the media bed 24 without exposing the supporting media 28. It is to be noted that the filtering media 26 is returning more rapidly towards the bottom portion 20 of the tank 16 than the fine particles themselves for allowing an optimized filtration of the raw liquid flow and to allow suspension of the fine particles to facilitate their removal. The media bed filters 10 as described above further allow a suspension of a part of the fine particles which are removed from the tank 16 during the backwash sequence.

According to an embodiment, the media bed 24 may include a supporting media 28 at the bottom surface 22 of the tank 16 for supporting the filtering media 26. It is to be noted that the supporting media 28 is below the filtering media 26. Additionally, the filtering media 26 and the supporting media 28 may each comprise an aggregate material. The aggregate material may be included in the group consisting of, without limitation, a rock material, a mesh particles material, a sand material, a course sand material, a fine sand material, a river sand, a garnet material (i.e., density of 4 for example), any combination of material and the like. It is to be noted that the sphericity of the filtering media 26 and of the supporting media 28 may be important for providing an improved filtration of the fine particles within the raw liquid flow. The supporting media 28 may include a plurality of supporting media layers (not shown). The plurality of supporting media layers is disposed in layers from the bottom surface 22 of the tank 16 and with the coarser supporting media layer at the bottom surface 22 of the tank 16. For example, a supporting media layer having a smaller diameter would be layered above another supporting media layer having a wider diameter. The filtering media 26 of the media bed 24 may comprise a 0.15 mm silica sand (effective size). For example, the media bed filter 10 may include two supporting media layers of different materials.

It is to be noted that the media bed filter 10 may filter fine particles down to submicron (about 0.25 micron-1 micron) and keep them above the media bed 24 (i.e., at least in part) and in the tank 16. It is also to be noted that the media bed filter 10 may use fine media (i.e., or granular media) less than 0.3 mm for allowing filtering particles down to less than one micron, 0.5 microns for example.

According to an embodiment, the tank 16 may define a vertical axis, an horizontal axis, a combination of axis or any other axis. Also, the tank 16 may define one of, without limitation, a spherical shape, a cylindrical shape, a prismatic shape, a regular polygonal prismatic shape, an irregular polygonal prismatic shape, an open tank shape, a doughnut-like shape, any combination, and the like.

According to another embodiment, the media bed filter 10 may further include a control unit (not shown) for electrically controlling one of the velocity of the plurality of jets exiting the nozzle configurations 32 and the orientation of the nozzle configurations 32 and the raw liquid inlets 30. It is to be mentioned that other parameter within or outside the tank 16 may be controlled via the control unit of the media bed filter 10.

Most preferably, the raw fluid flow to be filtered is a raw water flow, but it can be any other raw fluid flow depending on the application of the filtration. For instance, the media bed filter 10 may be used, without limitations, in chilled and hot water loops, in condensate return, in cooling tower make up, in iron removal, in water and wastewater treatment applications, in ion exchange resin pre-filtration, in membrane pre-filtration, in post clarifier discharge, in potable water treatments, in beverage treatments, in process rinse water, in process water intake, water reuse, welder water loops, and the like.

According to another embodiment, the velocity and the disengagement velocity may be in the range of 0.4 to 1.6 ft/s or greater depending on the disengagement velocity of the utilized filtering media 26 of the media bed 24.

The media bed filters 10 described above provide the raw liquid flow to circulate towards to filtering media 26 at a parallel velocity substantially equal or greater to the disengagement velocity of the filtering media 26. As a result, the filtering media 26 of the media bed 24 can be used without clogging rapidly the media bed 24, and the filtered fluid flow which may be largely free of impurities, is then filtered through the media bed 24 and subsequently collected. Contaminants trapped above the media bed 24 may be removed using an automatic backwash sequence, which requires less water and a shorter operating time. The backwash time is therefore half of the normal time. The media bed filters 10 can remove down to sub-micron levels at 5 times the flow rate of other media filters, while requiring 50% less water during backwash sequences.

It is to be noted that the media bed filters 10 as described above may provide with a better utilization of the surface area of the filtering media 26 and with a larger surface of filtration (i.e., since the nozzle configurations 32 allow the plurality of jets to circulate at a directional velocity substantially equal or greater to the disengagement velocity of the filtering media 26). The flow of raw liquid entering the media bed filter 10 may then be improved and/or optimized and the slope of the media bed 24 would be reduced compared to the one created during filtration within a traditional media bed filter (i.e., a slope having an angle of about 40° and over for a traditional media bed filter compared to a slope having an angle of about less than 30° for the media bed filters 10 as described above).

The media bed filters (i.e., crossflow media bed filters) as described above use nozzle configurations (i.e., injector designs) which sweeps actively the whole surface of the filtering media (i.e., microsand) for which a portion is put in suspension in the raw liquid (i.e., water) above the filtering media. The filtering media (i.e., microsand) settles back on the filtration surface faster than the fine particles to be removed from the tank of the media bed filter. This surface sweeping action effect keeps the surface filtering media from plugging quickly and keeps a portion of the fine particles to be removed in the water above the filtering media. The nozzles or injectors are located and designed within the tank such as to allow for the returning filtering media (i.e., microsand) to settle back on the surface in an evenly manner, thereby avoiding the traditional slope found in larger traditional vortex bed filters. This concept allows for a greater efficiency and avoids hydraulic short-circuiting in the media bed. The surface of the filtering media (i.e., microsand) of the media bed filters as described above has minimal deformation with ripples at its surface instead of the traditional slope created by the traditional injector design.

The present invention will be more readily understood by referring to the following examples which are given to illustrate the invention rather than to limit its scope.

Example 1

Surfaces and Angles Depending on the Diameter of the Tank

The media bed filter may define different angles of the filtering media depending on their diameter. For example, the angle of a 30" tank at its nominal raw water flow and water velocity injection is 40°.

The media bed filter and method may be applied in different size and shape of tanks with the numbers of nozzles and media bed adapted to the tank condition and the filtration area. The media bed filter has to reflect the water velocity at the filtration surface. The media bed filter may use a 0.15 mm sand particle horizontal critic speed at a density of about 2.65 to adjust the process. The critical speed (i.e., the disengagement velocity), at the filtration surface for the actual models, are in the range of 0.4 to 1.2 ft/s.

Example 2

Supporting Media Bed for 20" Tank

The supporting media bed may consist of several layers (Media from bags). After installing a layer, it must be leveled and compacted before to proceed to the next layer: (A bag of 50 lbs. has a volume of 0.5 $ft^3$)
Layer 1: ½×¼" Rock, 2 bags 1 $ft^3$
Layer 2: ¼×⅛" Rock, 1 bag 0.5 $ft^3$
Layer 3: 20 mesh (1 mm), 1 bag 0.5 $ft^3$
Layer 4: Course sand #40 (0.50 mm), 2 bags 1 $ft^3$
Layer 5: Fine sand #70 (0.15 mm), up to 6" below the upper raw liquid inlet, 3 bags 1.5 $ft^3$

Example 3

Referring now to Table 1 above, there is shown that the performance of a media bed filter is increased when the configuration of the media bed filter includes four nozzles (i.e., 4 up) oriented in an upwardly direction within the tank and when the flow rate is increased (i.e., up to a performance of 83% when the flow rate reaches 400 gpm) (FIGS. 10 and 11).

Figure 21:
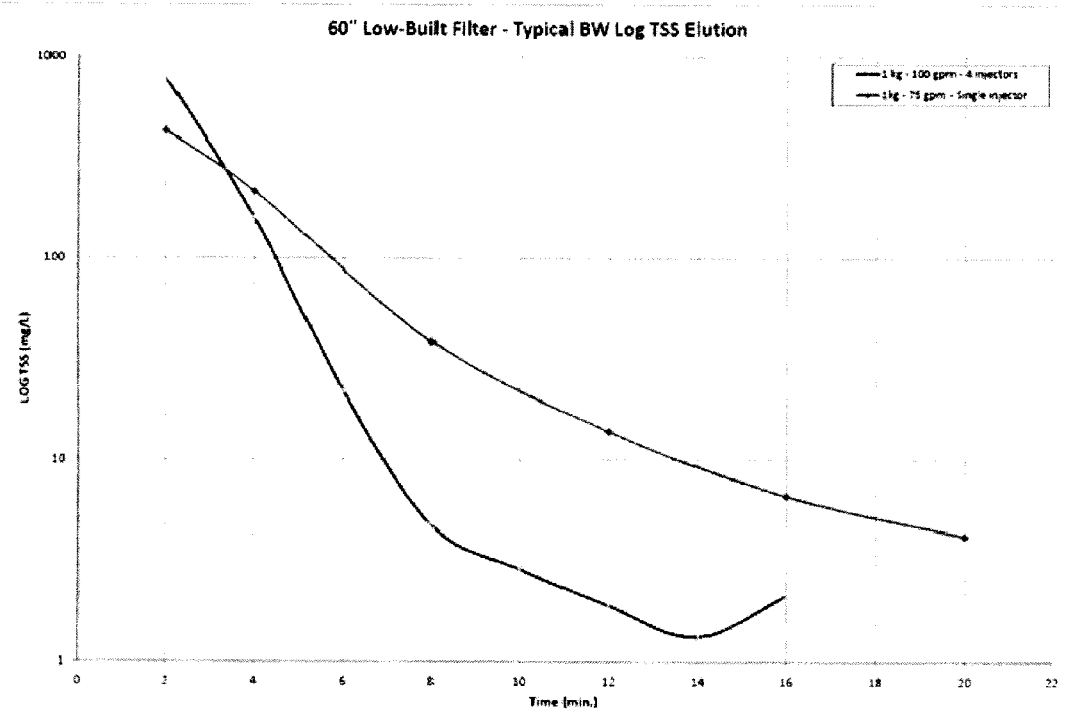
FIG. 21 is a graph showing elution for a media bed filter which includes four nozzles in accordance with another embodiment compared with a media bed filter system which includes one and only one nozzle.

FIG. 21 is a graph showing elution for a media bed filter which includes four nozzles in accordance with another embodiment compared with a media bed filter system which includes one and only one nozzle.

Figure 22:
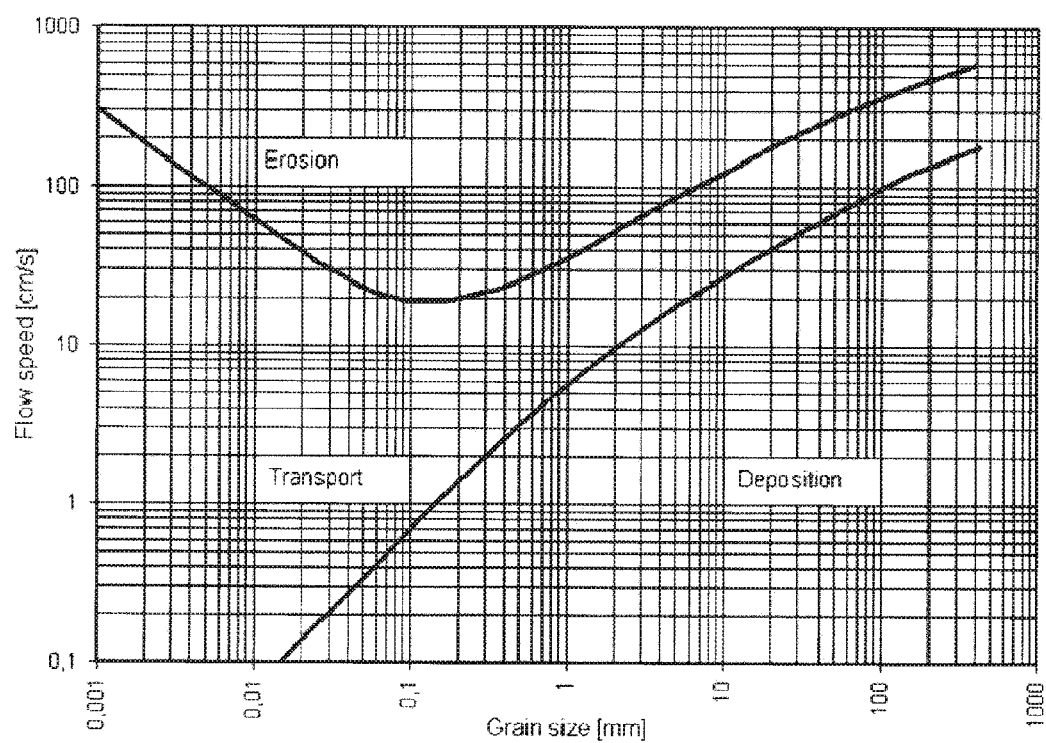
FIG. 22 is a graph which illustrates flow speeds (cm/s) of particles of the filtering media according to the diameter of these particles in accordance with another embodiment.

FIG. 22 is a graph, known in the art of river bed hydrology as the Hjulström curve, which illustrates flow speeds (cm/s) of particles of the filtering media according to the diameter of these particles in accordance with another embodiment. FIG. 22 may be used to establish the disengagement velocity of the filtering media which covers the supporting media using a flow speed above the deposition speed and below the erosion speed, namely within the transport speed range, for the grain size of the filtering media.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:
1. A method for filtering a raw liquid flow comprising:
providing a media bed filter comprising a tank having a top portion and a bottom portion defining a bottom surface, one or more raw liquid inlets and one or more filtered liquid outlets and a media bed having a supporting media disposed on the bottom surface and a filtering media covering the supporting media, the top portion of the tank being above the filtering media of the media bed,
providing a nozzle configuration within the tank to circulate the raw liquid flow,
disengaging the filtering media without erosion or deposition by circulating the raw liquid flow in a horizontal direction within the filtering media at a horizontal and-

TABLE 1

Performance of different media bed filters in relation with the nozzle configuration, the inlet flow rate and the kaolin concentration

| Injector Configuration | Freeboard (inch) | Flow (gpm) | Flow ($m^3$/h) | ΔP start (psi) | ΔP End (psi) | 1-2 μm Kaolin (kg) | Dosage Type | Inlet Concentration (mg/L) | Outlet average Concentration (mg/L) | Removal Performance |
|---|---|---|---|---|---|---|---|---|---|---|
| Prior Art - 1 inj. | 7.5 | 300 | 68 | 3 | 5 | 1 | slug | 140 | 71 | 49% |
| Prior Art - 1 inj. | 7.5 | 300 | 68 | 4 | 4.5 | 1 | slug | 185 | 77 | 58% |
| Prior Art - 1 inj. | 7.5 | 300 | 68 | 3.5 | 5 | 2 | slug | 319 | 146 | 54% |
| Prior Art Traditionnal | 7.25 | 300 | 68 | 7.5 | 9.5 | 1 | slug | 186 | 69 | 63% |
| 3 | 7.25 | 300 | 68 | 7 | 13 | 8 | interval | — | — | — |
| 3 | 7.25 | 300 | 68 | 7.5 | 12.5 | 4 | interval | — | — | — |
| 4 down | 7.25 | 300 | 68 | 7.5 | 9 | 1 | slug | 224 | 81 | 82% |
| 4 down | 7.25 | 300 | 68 | 7.5 | 9.5 | 1 | slug | 206 | 49 | 76% |
| 4 up | 7.25 | 300 | 68 | 8.5 | 13.5 | 4 | interval | — | — | — |
| 4 up | 7.25 | 300 | 68 | 8.25 | 10.25 | 1 | slug | 251 | 57 | 77% |
| 4 up | 7.25 | 300 | 68 | 8.5 | 11 | 2 | slug | 404 | 150 | 63% |
| 4 up | 7.25 | 300 | 68 | 7.75 | 9.25 | 1 | slug | 193 | 69 | 64% |
| 4 up | 7.5 | 350 | 79 | 7 | 8.5 | 1 | slug | 163 | 55 | 66% |
| 4 up | 7.5 | 300 | 68 | 6 | 13.5 | 6 | slug | 1058 | 478 | 55% |
| 4 up | 7.5 | 360 | 82 | 8.5 | 10.5 | 1.2 | slug | 250 | 60 | 76% |
| 4 up | 7.5 | 360 | 82 | 8 | 10 | 1 | slug | 191 | 37 | 81% |
| 4 up | 7.5 | 400 | 91 | 9 | 11 | 1 | slug | 203 | 53 | 74% |
| 4 up | 7.5 | 400 | 91 | 10.5 | 13 | 1 | slug | 235 | 41 | 83% |

* Performance of the media bed filter = (Concentration of fine particles IN − Concentration of fine particles OUT)/Concentration of fine particles IN parallel velocity substantially equal to a disengagement velocity of said filtering media to produce a filtered liquid, and collecting said filtered liquid through said one or more liquid outlets below said filtering media.

2. The method of claim 1, wherein the step of disengaging comprises providing the raw liquid flow above said media bed in the form of a plurality of jets towards a surface of the tank such that the flow is redirected in said horizontal and parallel directional velocity.

3. The method of claim 1, wherein the step of disengaging comprises providing the raw liquid flow in the form of a plurality of jets at substantially the same level of the filtering media, thereby providing the raw liquid flow in said substantially horizontal direction within said filtering media.

4. The method of claim 1, wherein the filtering media has a grain size less than 0.3 mm, said raw liquid contains contaminant particles to be removed less than one micron in size.

5. The method of claim 4, wherein the filtering media comprises silica sand of an effective size of about 0.15 mm.

6. The method of claim 4, wherein a portion of the particles to be removed in the raw liquid is kept above the filtering media in suspension, further comprising removing a part of the fine particles in suspension during a backwash.

* * * * *